(12) United States Patent
Sepe et al.

(10) Patent No.: US 11,745,035 B2
(45) Date of Patent: Sep. 5, 2023

(54) FALL PROTECTION COMPLIANCE SYSTEM AND METHOD

(71) Applicant: MSA Technology, LLC, Cranberry Township, PA (US)

(72) Inventors: Benjamin T. Sepe, Zelienople, PA (US); Jeffrey F. Harding, Pittsburgh, PA (US); Mitcham C. Tuell, Pittsburgh, PA (US); Robert Craig Campbell, Cranberry Township, PA (US); Christopher M. Stygar, Pittsburgh, PA (US); Peter I. Rutkowski, Allison Park, PA (US)

(73) Assignee: MSA Technology, LLC, Cranberry Township, PA (US)

( * ) Notice: Subject to any disclaimer, the term of this patent is extended or adjusted under 35 U.S.C. 154(b) by 90 days.

(21) Appl. No.: 16/742,381

(22) Filed: Jan. 14, 2020

(65) Prior Publication Data

US 2020/0222732 A1 Jul. 16, 2020

Related U.S. Application Data

(60) Provisional application No. 62/792,208, filed on Jan. 14, 2019, provisional application No. 62/861,545, (Continued)

(51) Int. Cl.
*A62B 35/00* (2006.01)
*G08B 21/02* (2006.01)
(Continued)

(52) U.S. Cl.
CPC ...... *A62B 35/0075* (2013.01); *A62B 35/0037* (2013.01); *A62B 35/0056* (2013.01);
(Continued)

(58) Field of Classification Search
CPC ............ A62B 35/0075; A62B 35/0037; A62B 35/0056; A62B 35/0068; A62B 35/0025;
(Continued)

(56) References Cited

U.S. PATENT DOCUMENTS

| 5,032,823 A | 7/1991 | Bower et al. |
| 5,762,282 A | 6/1998 | Wolner |

(Continued)

FOREIGN PATENT DOCUMENTS

| CN | 110198763 A | * 9/2019 | ........... G08B 21/043 |
| EP | 1277495 B1 | 9/2003 | |

(Continued)

OTHER PUBLICATIONS

"Electronic Partner for Individual Climbing (EPIC)", Faulhaber, 2018, pp. 1-3. Retrieved from https://www.faulhaber.com/it/markets/environmental-safety/electronic-partner-for-individual-climbing-epic/.

(Continued)

*Primary Examiner* — Brian Wilson
(74) *Attorney, Agent, or Firm* — Jones Day

(57) ABSTRACT

A connector for a fall protection compliance system includes a frame having an opening and a connection area configured for receiving a connection structure therein and a connection sensor assembly associated with the frame. The connection sensor assembly includes at least one permanent magnet configured for generating a magnetic field within at least a portion of the connection area, at least one magnetometer configured for detecting a presence or an absence of a disturbance in the magnetic field, and a control device having at least one processor programmed or configured to receive connection data from the at least one magnetometer, determine a connection status of the connector based on detecting the presence or the absence of the disturbance in (Continued)

the magnetic field, and perform at least one action based on the connection status. A method for detecting connection of a connector to a connection structure is also disclosed.

15 Claims, 12 Drawing Sheets

Related U.S. Application Data filed on Jun. 14, 2019, provisional application No. 62/944,071, filed on Dec. 5, 2019.

(51) Int. Cl.
*G08B 21/18* (2006.01)
*G06K 7/10* (2006.01)
*G08B 25/01* (2006.01)
*F16B 45/02* (2006.01)

(52) U.S. Cl.
CPC .............. *G06K 7/10* (2013.01); *G08B 21/02* (2013.01); *G08B 21/18* (2013.01); *G08B 25/016* (2013.01); *F16B 45/02* (2013.01)

(58) Field of Classification Search
CPC ...... G08B 25/016; G08B 21/02; G08B 21/18; G08B 21/0446; G06K 7/10; F16B 45/02
See application file for complete search history.

(56) References Cited

U.S. PATENT DOCUMENTS

| | | | |
|---|---|---|---|
| 5,771,993 A | 6/1998 | Anderson et al. |
| 6,265,983 B1 | 7/2001 | Baillargeon |
| 6,297,744 B1 | 10/2001 | Baillargeon et al. |
| 6,330,931 B1 | 12/2001 | Baillargeon et al. |
| 6,739,427 B2 | 5/2004 | Gayetty |
| 6,804,830 B2 | 10/2004 | Reynolds et al. |
| 7,237,650 B2 | 7/2007 | Casebolt |
| 7,744,063 B2 | 6/2010 | Jones |
| 7,815,013 B2 | 10/2010 | Griffith |
| 7,843,349 B2 | 11/2010 | Rohlf |
| 7,870,934 B2 | 1/2011 | Ecker |
| 7,946,387 B2 | 5/2011 | Betcher et al. |
| 7,987,945 B2 | 8/2011 | Petersen |
| 8,141,681 B2 | 3/2012 | Brickell et al. |
| 8,181,744 B2 | 5/2012 | Parker et al. |
| 8,191,815 B2 | 6/2012 | Huang |
| 8,205,718 B2 | 6/2012 | Taylor |
| 8,292,028 B2 | 10/2012 | Wise |
| 8,325,053 B2 | 12/2012 | Flynt et al. |
| 8,430,206 B2 | 4/2013 | Griffiths et al. |
| 8,430,207 B2 | 4/2013 | Griffiths et al. |
| 8,482,401 B2 | 7/2013 | Morino et al. |
| 8,490,750 B2 | 7/2013 | Balquist et al. |
| 8,511,434 B2 | 8/2013 | Blomberg |
| 8,528,694 B2 | 9/2013 | Meillet et al. |
| 8,550,225 B2 | 10/2013 | Blomberg et al. |
| 8,567,562 B2 | 10/2013 | Meillet et al. |
| 8,576,088 B2 | 11/2013 | Olofsson et al. |
| 8,701,833 B2 | 4/2014 | Marquardt et al. |
| 8,739,929 B2 | 6/2014 | Meillet et al. |
| 8,757,532 B2 | 6/2014 | Votel et al. |
| 8,800,715 B2 | 8/2014 | Olson et al. |
| 8,800,719 B2 | 8/2014 | Auston et al. |
| 8,893,854 B2 | 11/2014 | Casebolt |
| 8,902,074 B2 | 12/2014 | Landry et al. |
| 8,925,687 B2 | 1/2015 | Meillet et al. |
| 8,931,593 B2 | 1/2015 | Harris, Jr. |
| 8,950,551 B2 | 2/2015 | Jones et al. |
| 8,991,556 B2 | 3/2015 | Auston et al. |
| 9,089,723 B2 | 7/2015 | Bagnaro |
| 9,121,462 B2 | 9/2015 | Casebolt |
| 9,199,103 B2 | 12/2015 | Hetrich et al. |
| 9,238,573 B2 | 1/2016 | Luminet et al. |
| 9,242,128 B2 | 1/2016 | Macy |
| 9,245,434 B2 | 1/2016 | Baillargeon et al. |
| 9,283,412 B2 | 3/2016 | Myer |
| 9,320,925 B2 | 4/2016 | Wise |
| 9,411,994 B2 | 8/2016 | Alan |
| 9,427,607 B2 | 8/2016 | Renton et al. |
| 9,439,460 B2 | 9/2016 | Richards |
| 9,480,865 B2 | 11/2016 | Naylor et al. |
| 9,480,866 B2 | 11/2016 | Pollard |
| 9,511,245 B2 | 12/2016 | Moore, Jr. et al. |
| 9,643,034 B2 | 5/2017 | Wise |
| 9,704,370 B2 | 7/2017 | Ulner |
| 9,715,806 B2 | 7/2017 | Pham et al. |
| 9,715,809 B2 | 7/2017 | Pham et al. |
| 9,721,456 B2 | 8/2017 | Thurlow et al. |
| 9,827,451 B2 | 11/2017 | Renton et al. |
| 9,847,010 B2 | 12/2017 | Pham et al. |
| 9,913,999 B2 | 3/2018 | Balquist et al. |
| 10,022,573 B2 | 7/2018 | Jones et al. |
| 10,029,128 B2 | 7/2018 | Lin |
| 10,099,909 B2 | 10/2018 | Steedley |
| 10,125,837 B1 | 11/2018 | Fegley et al. |
| 10,149,991 B2 | 12/2018 | Schurian et al. |
| 10,159,859 B2 | 12/2018 | Wu |
| 10,223,898 B2 | 3/2019 | Pham et al. |
| 10,322,305 B2 | 6/2019 | Balquist et al. |
| 10,322,306 B2 | 6/2019 | Jones et al. |
| 10,496,045 B2 | 12/2019 | Hu et al. |
| 10,610,710 B2 | 4/2020 | Huseth et al. |
| 10,653,903 B2 | 5/2020 | Jones et al. |
| 10,744,354 B2 | 8/2020 | Choate et al. |
| 10,843,016 B2 | 11/2020 | Huseth et al. |
| 10,849,790 B2 | 12/2020 | Awiszus et al. |
| 10,940,338 B1 | 3/2021 | Miller et al. |
| 10,967,209 B2 | 4/2021 | Milbright |
| 11,120,679 B2 | 9/2021 | Negre et al. |
| 2004/0262080 A1 | 12/2004 | Reynolds et al. |
| 2005/0217937 A1 | 10/2005 | Rohlf |
| 2006/0021825 A1 | 2/2006 | An et al. |
| 2006/0163000 A1 | 7/2006 | Chowthi |
| 2007/0068731 A1 | 3/2007 | Griffith |
| 2008/0106398 A1 | 5/2008 | Rohlf |
| 2008/0303668 A1 | 12/2008 | Rohlf et al. |
| 2010/0116922 A1 | 5/2010 | Choate et al. |
| 2010/0231402 A1* | 9/2010 | Flynt .................... G08B 19/00 340/679 |
| 2010/0314196 A1 | 12/2010 | De Boeck |
| 2011/0059325 A1 | 3/2011 | Juan et al. |
| 2011/0090079 A1* | 4/2011 | Morino .............. A62B 35/0075 340/532 |
| 2011/0203871 A1 | 8/2011 | Faye et al. |
| 2012/0024640 A1 | 2/2012 | Argoud |
| 2012/0103724 A1 | 5/2012 | Reynolds et al. |
| 2012/0205478 A1 | 8/2012 | Balquist et al. |
| 2013/0020149 A1 | 1/2013 | Wise |
| 2013/0056302 A1 | 3/2013 | Bishop |
| 2013/0105246 A1 | 5/2013 | Schlangen et al. |
| 2013/0105247 A1 | 5/2013 | Casebolt |
| 2014/0190770 A1 | 7/2014 | Renton et al. |
| 2015/0027808 A1 | 1/2015 | Baillargeon et al. |
| 2015/0217981 A1 | 8/2015 | Baillargeon et al. |
| 2015/0231424 A1 | 8/2015 | Kim |
| 2015/0276521 A1* | 10/2015 | Moore, Jr. ............. A62B 35/00 702/41 |
| 2015/0284231 A1 | 10/2015 | Grant |
| 2017/0169533 A1 | 6/2017 | O'Brien |
| 2017/0193799 A1 | 7/2017 | Holub |
| 2017/0205784 A1 | 7/2017 | Huseth et al. |
| 2017/0287311 A1 | 10/2017 | Suryan et al. |
| 2017/0368387 A1 | 12/2017 | Fife et al. |
| 2017/0372216 A1 | 12/2017 | Awiszus et al. |
| 2018/0015312 A1 | 1/2018 | Jones et al. |
| 2018/0107169 A1 | 4/2018 | Hu et al. |
| 2018/0117373 A1 | 5/2018 | Cuny |
| 2018/0148144 A1 | 5/2018 | Turner |
| 2018/0161608 A1 | 6/2018 | Choate et al. |
| 2018/0257773 A1 | 9/2018 | Wypyszynski |
| 2019/0064750 A1 | 2/2019 | Awiszus et al. |
| 2019/0070444 A1 | 3/2019 | Seman |

(56) References Cited

U.S. PATENT DOCUMENTS

| | | |
|---|---|---|
| 2019/0073618 A1 | 3/2019 | Kanukurthy et al. |
| 2019/0083825 A1* | 3/2019 | Huseth ............... A62B 35/0037 |
| 2019/0126079 A1 | 5/2019 | Svoboda et al. |
| 2019/0134438 A1 | 5/2019 | Liggett et al. |
| 2019/0143159 A1 | 5/2019 | Grant |
| 2019/0175411 A1 | 6/2019 | Awiszus et al. |
| 2020/0016439 A1* | 1/2020 | Perner ............... A62B 35/0081 |
| 2020/0030644 A1 | 1/2020 | Boraas |
| 2020/0046040 A1 | 2/2020 | Kanukurthy et al. |
| 2020/0047006 A1 | 2/2020 | Blackford et al. |
| 2020/0096952 A1 | 3/2020 | Hu et al. |
| 2020/0101330 A1 | 4/2020 | Blackford et al. |
| 2020/0129790 A1 | 4/2020 | Stephenson et al. |
| 2020/0206549 A1 | 7/2020 | Shaver et al. |
| 2020/0206550 A1 | 7/2020 | Blackford et al. |
| 2020/0232172 A1 | 7/2020 | Lanter |
| 2020/0368563 A1 | 11/2020 | Nowicki et al. |
| 2020/0406074 A1 | 12/2020 | Fjelldal |
| 2021/0038930 A1 | 2/2021 | Milbright |
| 2021/0046340 A1 | 2/2021 | Miller et al. |
| 2021/0077840 A1 | 3/2021 | Boraas et al. |
| 2022/0266075 A1 | 8/2022 | Lepp et al. |

FOREIGN PATENT DOCUMENTS

| | | |
|---|---|---|
| EP | 1545713 B1 | 4/2008 |
| EP | 1993674 B1 | 4/2010 |
| EP | 1948324 B1 | 12/2010 |
| EP | 1968713 B1 | 9/2011 |
| EP | 2495017 A1 | 9/2012 |
| EP | 2049206 B1 | 10/2013 |
| EP | 2185247 B1 | 10/2013 |
| EP | 2495017 B1 | 10/2013 |
| EP | 2653195 A1 | 10/2013 |
| EP | 2777771 A2 | 9/2014 |
| EP | 2569056 B1 | 10/2014 |
| EP | 2736606 B1 | 9/2015 |
| EP | 3002044 A1 | 4/2016 |
| EP | 2247343 B1 | 12/2017 |
| EP | 2197556 B1 | 1/2018 |
| EP | 2195093 B1 | 4/2018 |
| EP | 2185246 B1 | 11/2018 |
| EP | 3437699 A1 | 2/2019 |
| EP | 2412408 B1 | 3/2019 |
| EP | 2249929 B1 | 4/2019 |
| EP | 2470733 B1 | 8/2020 |
| EP | 3289573 B1 | 10/2021 |
| WO | 2012158554 A2 | 11/2012 |
| WO | 2013061088 A2 | 5/2013 |
| WO | 2013063414 A2 | 5/2013 |
| WO | 2013135929 A1 | 9/2013 |
| WO | 2014009392 A2 | 1/2014 |
| WO | 2014199341 A1 | 12/2014 |
| WO | 2015136019 A1 | 9/2015 |
| WO | 2016011507 A1 | 1/2016 |
| WO | 2016120614 A1 | 8/2016 |
| WO | 2016196162 A1 | 12/2016 |
| WO | 2017040397 A1 | 3/2017 |
| WO | 2017078669 A1 | 5/2017 |
| WO | 2017116603 A1 | 7/2017 |
| WO | 2017155543 A1 | 9/2017 |
| WO | 2017180121 A1 | 10/2017 |
| WO | 2017223476 A1 | 12/2017 |
| WO | 2018018117 A1 | 2/2018 |
| WO | 2018056852 A1 | 3/2018 |
| WO | 2018071646 A1 | 4/2018 |
| WO | 2018150299 A1 | 8/2018 |
| WO | 2018152475 A1 | 8/2018 |
| WO | 2018178780 A2 | 10/2018 |
| WO | 2019012454 A1 | 1/2019 |
| WO | 2019016330 A2 | 1/2019 |
| WO | 2019043265 A1 | 3/2019 |
| WO | 2019157007 A1 | 8/2019 |

OTHER PUBLICATIONS

"Honeywell And Intel Demonstrate Prototype Of Wearable IoT Connected Safety Solution For Industrial Workers And First Responders", PR Newswire, 2015, pp. 1-4. Retrieved from https://www.prnewswire.com/news-releases/honeywell-and-intel-demonstrate-prototype-of-wearable-iot-connected-safety-solution-for-industrial-workers-and-first-responders-300171334.html.

"Honeywell Introduces Simple, Cost-Effective Way To "Connect" Safety Equipment", Yahoo! Finance, 2018, pp. 1-2. Retrieved from https://www.honeywell.com/us/en/press/2018/02/honeywell-introduces-simple-cost-effective-way-to-connect-safety-equipment, Accesed Nov. 16, 2018.

Kanan et al., "An IoT-based autonomous system for workers' safety in construction sites with real-time alarming, monitoring, and positioning strategies", Automation in Construction, 2018, pp. 73-86, vol. 88.

Kelm et al., "Mobile passive Radio Frequency Identification (RFID) portal for automated and rapid control of Personal Protective Equipment (PPE) on construction sites", Automation in Construction, 2013, pp. 38-52, vol. 36.

Teizer et al., "Autonomous pro-active real-time construction worker and equipment operator proximity safety alert system", Automation in Construction, 2010, pp. 630-640, vol. 19.

* cited by examiner

FALL PROTECTION COMPLIANCE SYSTEM AND METHOD

CROSS-REFERENCE TO RELATED APPLICATIONS

This application claims priority to U.S. Provisional Application No. 62/792,208, filed Jan. 14, 2019, U.S. Provisional Application No. 62/861,545, filed Jun. 14, 2019, and U.S. Provisional Application No. 62/944,071, filed Dec. 5, 2019, the disclosures of which are incorporated by reference herein in their entirety.

BACKGROUND

Technical Field

The present disclosure relates generally to the field of safety equipment, and more particularly, to systems and methods for monitoring and recording the use of fall protection equipment.

Technical Description

Safety equipment is often required in the fields of construction, rescue operations, and recreational activities that occur in environments that pose a danger to the user, such as a risk of falling from an elevated height. Most safety equipment is subject to compliance with various regulatory standards, such as those instituted by the Occupational Safety and Health Administration (OSHA) and the National Institute for Occupational Safety and Health (NIOSH). These standards contain information regarding the use of safety equipment, as well as the need for proper inspection, monitoring, and record keeping.

A number of challenges exist regarding inspection, monitoring, and record keeping for safety equipment. For example, verification of use and compliance of such use with existing standards is difficult to confirm without actual physical inspection of the individual wearing the safety equipment while performing the activity. Direct and ongoing verification of use for compliance is virtually impossible in environments where dozens of workers at a construction site may be using different types of safety equipment.

In view of these and other disadvantages of existing safety equipment, it is desirable to provide systems and methods for monitoring and recording the use of safety equipment.

SUMMARY

Therefore, and generally, the present disclosure provides improved systems and methods for monitoring and recording the use of safety equipment. In particular, the present disclosure provides a fall protection compliance system and method that may be configured to detect that a connection has been made between a worker wearing a fall protection harness or similar safety equipment, and an anchor point. The system and method may be further configured to indicate the proper connection, disconnection, and usage compliance of the safety equipment regarding an unsafe or safe condition or area. The system and method may be further configured to store information regarding various aspects of the system, such as connection status of the safety equipment and/or length of use of the safety equipment. The system and method may be further configured to transmit connection status information to an external device or system.

In some non-limiting embodiments or aspects, a connector for a fall protection compliance system may include a frame having an opening and a connection area configured for receiving a connection structure therein, and a connection sensor assembly associated with the frame. The connection sensor assembly may include at least one permanent magnet configured for generating a magnetic field within at least a portion of the connection area, at least one magnetometer configured for detecting a presence or an absence of a disturbance in the magnetic field, and a control device having at least one processor programmed or configured to: receive connection data from the at least one magnetometer, determine a connection status of the connector based on detecting the presence or the absence of the disturbance in the magnetic field, and perform at least one action based on the connection status.

In some non-limiting embodiments or aspects, detecting the presence of the disturbance in the magnetic field may be indicative of a presence of a ferromagnetic material of the connection structure within the connection area, and detecting the absence of the disturbance in the magnetic field may be indicative of an absence of the ferromagnetic material of the connection structure within the connection area.

In some non-limiting embodiments or aspects, the connection status may include a connected status indicative of a presence of a ferromagnetic material of the connection structure within the connection area and a disconnected status indicative of an absence of the ferromagnetic material of the connection structure within the connection area.

In some non-limiting embodiments or aspects, the at least one action may include providing at least one of a visual indication, an audio indication, and a tactile indication based on the connection status. The at least one action may include providing at least one of a first visual indication, a first audio indication, and a first tactile indication indicative of a presence of a ferromagnetic material of the connection structure within the connection area, or providing at least one of a second visual indication, a second audio indication, and a second tactile indication indicative of an absence of the ferromagnetic material of the connection structure within the connection area. At least one of the first visual indication, the first audio indication, and the first tactile indication may be the same as or different from the second visual indication, the second audio indication, and the second tactile indication.

In some non-limiting embodiments or aspects, the connection sensor assembly further may include a communication interface, and the at least one action may include transmitting the connection status to a remote device using the communication interface. The connection sensor assembly further may include at least one short-range wireless communication antenna configured for detecting a presence or an absence of an identification element on the connection structure, and at least one processor may be further programmed or configured to: receive communication data from the at least short-range wireless communication antenna, and determine the connection status of the connector based on detecting the presence or the absence of the identification element. Detecting the presence of the identification element may be indicative of a presence of an approved connection structure, and detecting the absence of the identification element may be indicative of an absence of the approved connection structure.

In some non-limiting embodiments or aspects, the at least one processor may be further programmed or configured for storing the data received from the at least one magnetometer and the at least short-range wireless communication antenna. The at least one magnet and the at least one magnetometer may be positioned away from a surface of the frame that is configured for contacting the connection structure.

In some non-limiting embodiments or aspects, the connector may have a gate for selectively enclosing the opening of the frame. The gate may be movable between a closed position preventing passage through the opening and into the connection area and an open position permitting passage through the opening and into the connection area. The gate may be biased to the closed position by a biasing member. A locking assembly may be operatively connected to the gate and movable between a first position and a second position. In the first position, the locking assembly may be configured for preventing movement of the gate from the closed position toward the open position, and, in the second position, the locking assembly may be configured for permitting movement of the gate from the closed position toward the open position.

In some non-limiting embodiments or aspects, a computer-implemented method for detecting connection of a connector to a connection structure may include receiving, with a control device having at least one processor, connection data gathered by at least one sensor configured for detecting a presence or an absence of an object within a connection area of the connector, determining, with the control device, a connection status of the connector based on detecting the presence or the absence of the object, and performing, with the control device, at least one action based on the connection status.

In some non-limiting embodiments or aspects, detecting the presence of the object may be based on detecting a disturbance in a magnetic field within the connection area that is indicative of a presence of a ferromagnetic material of the connection structure within the connection area, and detecting the absence of the object may be based on detecting a disturbance in the magnetic field within the connection area that is indicative of an absence of the ferromagnetic material of the connection structure within the connection area.

In some non-limiting embodiments or aspects, performing the at least one action may include providing at least one of a visual indication, an audio indication, and a tactile indication based on the connection status.

In some non-limiting embodiments or aspects, the method may further include receiving, with the control device, communication data gathered by at least one short-range wireless communication antenna configured for detecting a presence or an absence of an identification element on the connection structure. Determining the connection status of the connector may be further based on detecting the presence or the absence of the identification element on the connection structure.

In some non-limiting embodiments or aspects, a connector for a fall protection compliance system may include a frame having an opening and a connection area configured for receiving a connection structure therein, and a connection sensor assembly associated with the frame. The connection sensor assembly may have at least one permanent magnet configured for generating a magnetic field within at least a portion of the connection area, at least one magnetometer configured for detecting a presence or an absence of a disturbance in the magnetic field, at least one short-range wireless communication antenna configured for detecting a presence or an absence of an identification element on the connection structure, and a control device having at least one processor programmed or configured to: receive connection data from the at least one magnetometer and communication data from the at least short-range wireless communication antenna, determine a connection status of the connector based on detecting the presence or the absence of the disturbance in the magnetic field and based on detecting the presence or the absence of the identification element, and perform at least one action based on the connection status. Detecting the presence of the disturbance in the magnetic field may be indicative of a presence of a ferromagnetic material of the connection structure within the connection area. Detecting the absence of the disturbance in the magnetic field may be indicative of an absence of the ferromagnetic material of the connection structure within the connection area. Detecting the presence of the identification element may be indicative of a presence of an approved connection structure, and detecting the absence of the identification element may be indicative of an absence of the approved connection structure.

In some non-limiting embodiments or aspects, a connector for a fall protection compliance system may have a frame having an opening and a connection area configured for receiving a connection structure therein, and a connection sensor assembly associated with the frame. The connection sensor assembly may have at least one short-range wireless communication antenna configured for detecting a presence or an absence of an identification element on the connection structure, and a control device having at least one processor programmed or configured to: receive communication data from the at least short-range wireless communication antenna, determine a connection status of the connector based on detecting the presence or the absence of the identification element, and perform at least one action based on the connection status.

In some non-limiting embodiments or aspects, detecting the presence of the identification element may be indicative of a presence of an approved connection structure, and detecting the absence of the identification element may be indicative of an absence of the approved connection structure. The connection status may include a connected status indicative of a presence of an approved connection structure, and a disconnected status indicative of an absence of the approved connection structure. The at least one action may include providing at least one of a visual indication, an audio indication, and a tactile indication based on the connection status. The connection sensor assembly further may include a communication interface, and wherein the at least one action includes transmitting the connection status to a remote device using the communication interface.

Further non-limiting embodiments or aspects will now be described in the following numbered clauses.

Clause 1. A connector for a fall protection compliance system, the connector comprising: a frame having an opening and a connection area configured for receiving a connection structure therein; and a connection sensor assembly associated with the frame, the connection sensor assembly comprising: at least one permanent magnet configured for generating a magnetic field within at least a portion of the connection area; at least one magnetometer configured for detecting a presence or an absence of a disturbance in the magnetic field; and a control device comprising at least one processor programmed or configured to: receive connection data from the at least one magnetometer; determine a connection status of the connector based on detecting the presence or the absence of the disturbance in the magnetic field; and perform at least one action based on the connection status.

Clause 2. The connector according to clause 1, wherein detecting the presence of the disturbance in the magnetic field is indicative of a presence of a ferromagnetic material of the connection structure within the connection area, and wherein detecting the absence of the disturbance in the magnetic field is indicative of an absence of the ferromagnetic material of the connection structure within the connection area.

Clause 3. The connector according to clause 1 or 2, wherein the connection status comprises a connected status indicative of a presence of a ferromagnetic material of the connection structure within the connection area and a disconnected status indicative of an absence of the ferromagnetic material of the connection structure within the connection area.

Clause 4. The connector according to any of clauses 1-3, wherein the at least one action includes providing at least one of a visual indication, an audio indication, and a tactile indication based on the connection status.

Clause 5. The connector according to any of clauses 1-4, wherein the at least one action includes providing at least one of a first visual indication, a first audio indication, and a first tactile indication indicative of a presence of a ferromagnetic material of the connection structure within the connection area, or providing at least one of a second visual indication, a second audio indication, and a second tactile indication indicative of an absence of the ferromagnetic material of the connection structure within the connection area.

Clause 6. The connector according to any of clauses 1-5, wherein at least one of the first visual indication, the first audio indication, and the first tactile indication is the same as the second visual indication, the second audio indication, and the second tactile indication.

Clause 7. The connector according to any of clauses 1-6, wherein at least one of the first visual indication, the first audio indication, and the first tactile indication is different from the second visual indication, the second audio indication, and the second tactile indication.

Clause 8. The connector according to any of clauses 1-7, wherein the connection sensor assembly further comprises a communication interface, and wherein the at least one action includes transmitting the connection status to a remote device using the communication interface.

Clause 9. The connector according to any of clauses 1-8, wherein the connection sensor assembly further comprises at least one short-range wireless communication antenna configured for detecting a presence or an absence of an identification element on the connection structure, and wherein at least one processor is further programmed or configured to: receive communication data from the at least short-range wireless communication antenna; and determine the connection status of the connector based on detecting the presence or the absence of the identification element.

Clause 10. The connector according to any of clauses 1-9, wherein detecting the presence of the identification element is indicative of a presence of an approved connection structure, and wherein detecting the absence of the identification element is indicative of an absence of the approved connection structure.

Clause 11. The connector according to any of clauses 1-10, wherein the at least one processor is further programmed or configured for storing the data received from the at least one magnetometer and the at least one short-range wireless communication antenna.

Clause 12. The connector according to any of clauses 1-11, wherein the at least one magnet and the at least one magnetometer are positioned away from a surface of the frame that is configured for contacting the connection structure.

Clause 13. The connector according to any of clauses 1-12, further comprising a gate for selectively enclosing the opening of the frame, wherein the gate is movable between a closed position preventing passage through the opening and into the connection area and an open position permitting passage through the opening and into the connection area.

Clause 14. The connector according to any of clauses 1-13, wherein the gate is biased to the closed position by a biasing member.

Clause 15. The connector according to any of clauses 1-14, further comprising a locking assembly operatively connected to the gate and movable between a first position and a second position, wherein, in the first position, the locking assembly is configured for preventing movement of the gate from the closed position toward the open position, and wherein, in the second position, the locking assembly is configured for permitting movement of the gate from the closed position toward the open position.

Clause 16. A computer-implemented method for detecting connection of a connector to a connection structure, the method comprising: receiving, with a control device comprising at least one processor, connection data gathered by at least one sensor configured for detecting a presence or an absence of an object within a connection area of the connector and; determining, with the control device, a connection status of the connector based on detecting the presence or the absence of the object, and performing, with the control device, at least one action based on the connection status.

Clause 17. The method according to clause 16, wherein detecting the presence of the object is based on detecting a disturbance in a magnetic field within the connection area that is indicative of a presence of a ferromagnetic material of the connection structure within the connection area, and wherein detecting the absence of the object is based on detecting a disturbance in the magnetic field within the connection area that is indicative of an absence of the ferromagnetic material of the connection structure within the connection area.

Clause 18. The method according to clause 16 or 17, wherein performing the at least one action includes providing at least one of a visual indication, an audio indication, and a tactile indication based on the connection status.

Clause 19. The method according to any of clauses 16-18, further comprising: receiving, with the control device, communication data gathered by at least one short-range wireless communication antenna configured for detecting a presence or an absence of an identification element on the connection structure, wherein determining the connection status of the connector is further based on detecting the presence or the absence of the identification element on the connection structure.

Clause 20. A connector for a fall protection compliance system, the connector comprising: a frame having an opening and a connection area configured for receiving a connection structure therein; and a connection sensor assembly associated with the frame, the connection sensor assembly comprising: at least one permanent magnet configured for generating a magnetic field within at least a portion of the connection area; at least one magnetometer configured for detecting a presence or an absence of a disturbance in the magnetic field; at least one short-range wireless communication antenna configured for detecting a presence or an absence of an identification element on the connection structure; and a control device comprising at least one processor programmed or configured to: receive connection data from the at least one magnetometer and communication data from the at least one short-range wireless communication antenna; determine a connection status of the connector based on detecting the presence or the absence of the disturbance in the magnetic field and based on detecting the presence or the absence of the identification element; and perform at least one action based on the connection status, wherein detecting the presence of the disturbance in the magnetic field is indicative of a presence of a ferromagnetic material of the connection structure within the connection area, wherein detecting the absence of the disturbance in the magnetic field is indicative of an absence of the ferromagnetic material of the connection structure within the connection area, wherein detecting the presence of the identification element is indicative of a presence of an approved connection structure, and wherein detecting the absence of the identification element is indicative of an absence of the approved connection structure.

Clause 21. A connector for a fall protection compliance system, the connector comprising: a frame having an opening and a connection area configured for receiving a connection structure therein; and a connection sensor assembly associated with the frame, the connection sensor assembly comprising: at least one short-range wireless communication antenna configured for detecting a presence or an absence of an identification element on the connection structure; and a control device comprising at least one processor programmed or configured to: receive communication data from the at least one short-range wireless communication antenna; determine a connection status of the connector based on detecting the presence or the absence of the identification element; and perform at least one action based on the connection status.

Clause 22. The connector according to clause 21, wherein detecting the presence of the identification element is indicative of a presence of an approved connection structure, and wherein detecting the absence of the identification element is indicative of an absence of the approved connection structure.

Clause 23. The connector according to clause 21 or 22, wherein the connection status comprises a connected status indicative of a presence of an approved connection structure, and a disconnected status indicative of an absence of the approved connection structure.

Clause 24. The connector according to any of clauses 21-23, wherein the at least one action includes providing at least one of a visual indication, an audio indication, and a tactile indication based on the connection status.

Clause 25. The connector according to any of clauses 21-24, wherein the connection sensor assembly further comprises a communication interface, and wherein the at least one action includes transmitting the connection status to a remote device using the communication interface.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. Hence, specific dimensions and other physical characteristics related to the embodiments disclosed herein are not to be considered as limiting. Further, it is to be understood that the disclosure may assume various alternative variations and step sequences, except where expressly specified to the contrary.

BRIEF DESCRIPTION OF THE DRAWINGS

Additional advantages and details of non-limiting embodiments or aspects are explained in greater detail below with reference to the exemplary embodiments that are illustrated in the accompanying schematic figures, in which.

Figure 1:
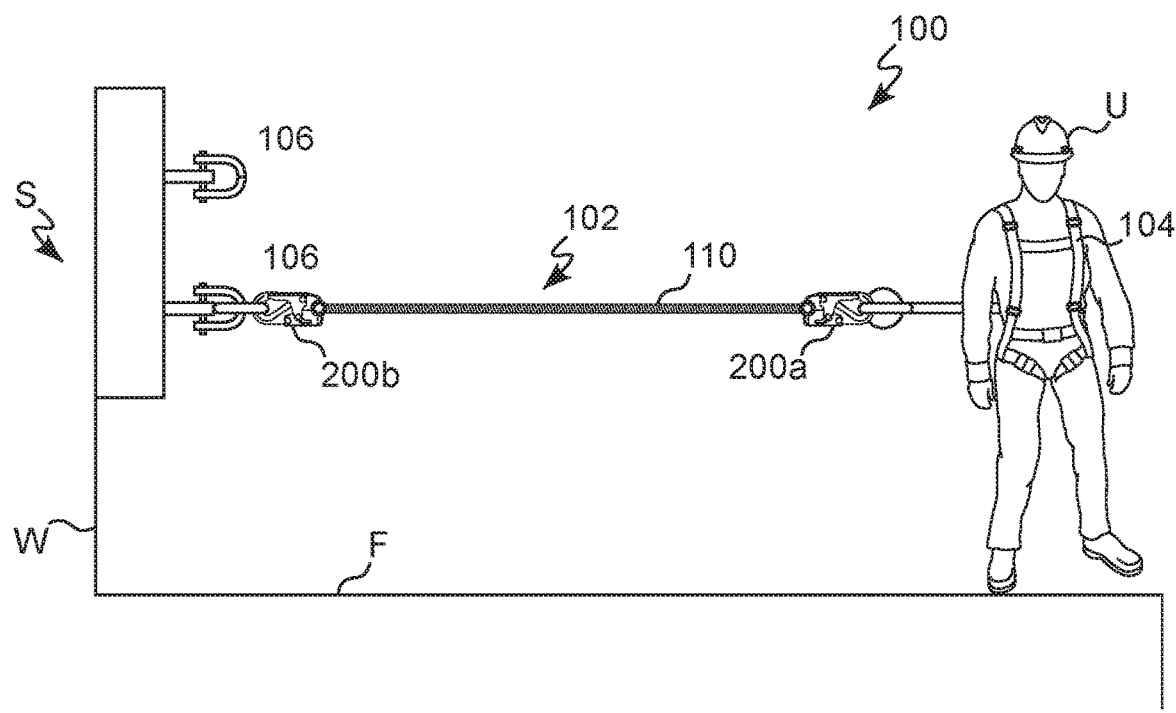
FIG. 1 is an illustration of a fall protection compliance system in accordance with some non-limiting embodiments or aspects of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer-readable medium and executed by a computer or processor, whether such computer or processor is explicitly shown. While each of the figures illustrates a particular embodiment for purposes of illustrating a clear example, other embodiments may omit, add to, reorder, and/or modify any of the elements shown in the figures.

DETAILED DESCRIPTION

For purposes of the description hereinafter, the terms "end", "upper", "lower", "right", "left", "vertical", "horizontal", "top", "bottom", "lateral", "longitudinal" and derivatives thereof shall relate to the disclosure as it is oriented in the drawing figures. However, it is to be understood that the disclosure may assume various alternative variations and step sequences, except where expressly specified to the contrary.

All numbers and ranges used in the specification and claims are to be understood as being modified in all instances by the term "about". By "about" is meant plus or minus twenty-five percent of the stated value, such as plus or minus ten percent of the stated value. However, this should not be considered as limiting to any analysis of the values under the doctrine of equivalents.

Unless otherwise indicated, all ranges or ratios disclosed herein are to be understood to encompass the beginning and ending values and any and all subranges or subratios subsumed therein. For example, a stated range or ratio of "1 to 10" should be considered to include any and all subranges or subratios between (and inclusive of) the minimum value of 1 and the maximum value of 10; that is, all subranges or subratios beginning with a minimum value of 1 or more and ending with a maximum value of 10 or less. The ranges and/or ratios disclosed herein represent the average values over the specified range and/or ratio.

The terms "first", "second", and the like are not intended to refer to any particular order or chronology, but refer to different conditions, properties, or elements.

The term "at least" is synonymous with "greater than or equal to".

As used herein, "at least one of" is synonymous with "one or more of". For example, the phrase "at least one of A, B, and C" means any one of A, B, or C, or any combination of any two or more of A, B, or C. For example, "at least one of A, B, and C" includes one or more of A alone; or one or more B alone; or one or more of C alone; or one or more of A and one or more of B; or one or more of A and one or more of C; or one or more of B and one or more of C; or one or more of all of A, B, and C.

As used herein, the terms "parallel" or "substantially parallel" mean a relative angle as between two objects (if extended to theoretical intersection), such as elongated objects and including reference lines, that is from 0° to 5°, or from 0° to 3°, or from 0° to 2°, or from 0° to 1°, or from 0° to 0.5°, or from 0° to 0.25°, or from 0° to 0.1°, inclusive of the recited values.

As used herein, the terms "perpendicular" or "substantially perpendicular" mean a relative angle as between two objects at their real or theoretical intersection is from 85° to 90°, or from 87° to 90°, or from 88° to 90°, or from 89° to 90°, or from 89.5° to 90°, or from 89.75° to 90°, or from 89.9° to 90°, inclusive of the recited values.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

The terms "comprises", "comprising", or any other variations thereof, are intended to cover a non-exclusive inclusion, such that a setup, device, or method that comprises a list of components or steps does not include only those components or steps but may include other components or steps not expressly listed or inherent to such setup, device, or method. In other words, one or more elements in a system or apparatus proceeded by "comprises . . . a" does not, without more constraints, preclude the existence of other elements or additional elements in the system or method.

The terms "includes", "including", or any other variations thereof are intended to cover a non-exclusive inclusion such that a setup, device, or method that includes a list of components or steps does not include only those components or steps but may include other components or steps not expressly listed or inherent to such setup, device, or method. In other words, one or more elements in a system or apparatus proceeded by "includes . . . a" does not, without more constraints, preclude the existence of other elements or additional elements in the system or method.

The terms "an embodiment", "embodiment", "embodiments", "the embodiment", "the embodiments", "one or more embodiments", "some non-limiting embodiments or aspects", and "one embodiment" mean "one or more (but not all) embodiments of the invention(s)" unless expressly specified otherwise. A description of an embodiment with several components in communication with each other does not imply that all such components are required. On the contrary, a variety of optional components is described to illustrate the wide variety of possible embodiments of the disclosure.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has", "have", "having", or the like are intended to be open-ended terms. Further, the phrase "based on" is intended to mean "based at least in partially on" unless explicitly stated otherwise. The term "some non-limiting embodiments or aspects" means "one or more (but not all) embodiments or aspects of the disclosure(s)" unless expressly specified otherwise. A description of some non-limiting embodiments or aspects with several components in communication with each other does not imply that all such components are required. On the contrary, a variety of optional components is described to illustrate the wide variety of possible embodiments of the disclosure.

When a single device or article is described herein, it will be clear that more than one device/article (whether they cooperate) may be used in place of a single device/article. Similarly, where more than one device or article is described herein (whether they cooperate), it will be clear that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the disclosure need not include the device itself.

As used herein, the terms "communication", "communicate", "send", and/or "receive" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and communicates the processed information to the second unit. In some non-limiting embodiments or aspects, a message may refer to a network packet (e.g., a data packet and/or the like) that includes data. It will be appreciated that numerous other arrangements are possible.

As used herein, the terms "server" and/or "processor" may refer to one or more computing devices, such as processors, storage devices, and/or similar computer components that communicate with client devices and/or other computing devices over a network, such as the Internet or private networks, and, in some examples, facilitate communication among other servers and/or client devices. It will be appreciated that various other arrangements are possible. As used herein, the term "system" may refer to one or more computing devices or combinations of computing devices such as, but not limited to, processors, servers, client devices, software applications, and/or other like components. In addition, reference to "a server" or "a processor", as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

As used herein, the term "remote device" may refer to one or more computing devices, which may be used by a remote user, such as an industrial hygienist or a project manager, to monitor compliant use of a fall protection compliance system. In some non-limiting embodiments, a remote device may include a computing device configured to communicate with one or more networks and/or facilitate at least one of receiving and sending information from and to a connector, such as, but not limited to, one or more desktop computers, one or more mobile devices, and/or other like devices.

As used herein, the term "computing device" may refer to one or more electronic devices that are configured to directly or indirectly communicate with or over one or more networks. In some non-limiting embodiments, a computing device may include a mobile device. A mobile device may include a smartphone, a portable computer, a wearable device (e.g., watches, glasses, lenses, clothing, and/or the like), a personal digital assistant (PDA), and/or other like devices. In some non-limiting embodiments, a computing device may include a server, a desktop computer, and/or the like.

As used herein, the term "system" may refer to one or more computing devices or combinations of computing devices such as, but not limited to, processors, servers, client devices, software applications, and/or other like components. In addition, reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

As discussed herein, certain operations may be performed in a different order, modified, or removed. Moreover, steps may be added to the above-described logic and still conform to the described embodiments. Further, operations described herein may occur sequentially or certain operations may be processed in parallel. Yet further, operations may be performed by a single processing unit or by distributed processing units.

In the following detailed description of the embodiments of the disclosure, reference is made to the accompanying drawings that form a part hereof, and in which are shown by way of illustration specific embodiments in which the disclosure may be practiced. It should be understood, however, that it is not intended to limit the disclosure to the forms disclosed, but on the contrary, the disclosure is to cover all modifications, equivalents, and alternatives falling within the spirit and the scope of the disclosure. It is to be understood that other embodiments may be utilized and that changes may be made without departing from the scope of the present disclosure. The following description is, therefore, not to be taken in a limiting sense.

Various embodiments or aspects of the present disclosure are directed to comprehensive fall protection compliance systems and methods for directly monitoring worker safety while using safety equipment, such as fall protection equipment. In some non-limiting embodiments or aspects, the system may be a passive monitoring system that collects data regarding the direct usage and coupling of fall protection equipment, such as, without limitation, harnesses, lanyards, anchorages, horizontal and vertical lifelines, as well as winches, davits, and other raising and lowering equipment.

In some non-limiting embodiments or aspects, the fall protection compliance system may be configured to detect, such as using one or more electronic sensors, that a connection has been made between a user wearing a fall protection harness or similar safety equipment, and an anchor point. The system may be further configured to indicate the proper connection, disconnection, and usage compliance of the safety equipment regarding an unsafe or safe condition or area. The system may be configured to monitor the connection between the user and the safety equipment and determine whether the worker is securely connected to the safety equipment. In some non-limiting embodiments or aspects, the system may be configured to store information regarding various aspects of the system, such as proper connection of the safety equipment, length of use of the safety equipment, identification of connection to a particular piece of safety equipment. The stored data may have a time and date stamp. In some non-limiting embodiments or aspects, the stored data can be transmitted to a remote device, such as a cell phone or an external monitoring station, and/or stored locally in memory storage for later retrieval.

In some non-limiting embodiments or aspects, the stored data may indicate the worker identification number, the device identification number, current time, total time that the worker is wearing or connected to the safety equipment, and individual periods of use or non-use of the safety equipment. The system may have built-in algorithms and safeties to both indicate that the user is using the equipment in compliance with standards, but also to prevent tampering or obfuscation of the results. This ensures that the user uses the equipment properly and eliminates the need for direct physical inspection of compliance by an industrial hygienist or compliance officer.

With initial reference to FIG. 1, a fall protection compliance system 100 is illustrated in accordance with some non-limiting embodiments or aspects of the present disclosure. The fall protection compliance system 100 includes at least one piece of fall protection safety equipment 102 that is configured for securing a user U wearing a harness 104 to an anchor 106 secured to a wall W, floor F, ceiling, or other component of a structure S. In some non-limiting embodiments or aspects, the fall protection safety equipment 102 may have a first connector 200a at its first end and a second connector 200b at its second end. The first connector 200a may be configured for connecting directly to the harness 104 or another piece of safety equipment, such as an energy absorber, that is directly connected to the harness 104. The second connector 200b may be configured for connecting directly to the anchor 106 or to another piece of safety equipment, such as an energy absorber, that is connected directly to the anchor 106. In this manner, the fall protection safety equipment 102 is configured to connect the user U wearing the harness 104 to the anchor 106. The fall protection safety equipment 102, the harness 104, and the anchor 106 together define the fall protection compliance system 100.

In some non-limiting embodiments or aspects, the fall protection safety equipment 102 may be a lanyard 110 having the first connector 200a at its first end and the second connector 200b at its second end. In other non-limiting embodiments or aspects, the fall protection safety equipment 102 may a line retraction device, such as a self-retracting lanyard (SRL). The SRL may have a safety line that is configured to be unwound (paid out) from a drum when a certain level of tension is applied to the safety line, such as during movement of the user U on the structure S. When such tension is reduced or released, the SRL is configured to slowly rotate in a reverse direction, thereby causing the safety line to retract or rewind onto the drum.

As further described herein, the fall protection safety equipment 102 includes one or more sensors and associated control devices configured to gather data in real-time as the user U engages in activities on the structure S while wearing the fall protection safety equipment 102. For example, the fall protection safety equipment 102 may include one or more sensors configured to detect a connection status of at least one of the first and second connectors 200a, 200b. In addition, the fall protection safety equipment 102 may include one or more output devices for outputting data that is indicative of the connection status of at least one of the first and second connectors 200a, 200b. For example, the fall protection safety equipment 102 may include one or more devices to generate at least one of an audible feedback (e.g., one or more speakers), a visual feedback (e.g., one or more displays, light emitting diodes (LEDs), or the like), or a tactile feedback (e.g., a vibration device). In addition, the fall protection safety equipment 102 may be configured to transmit the connection status of at least one of the first and second connectors 200a, 200b to a remote device.

Figure 2:
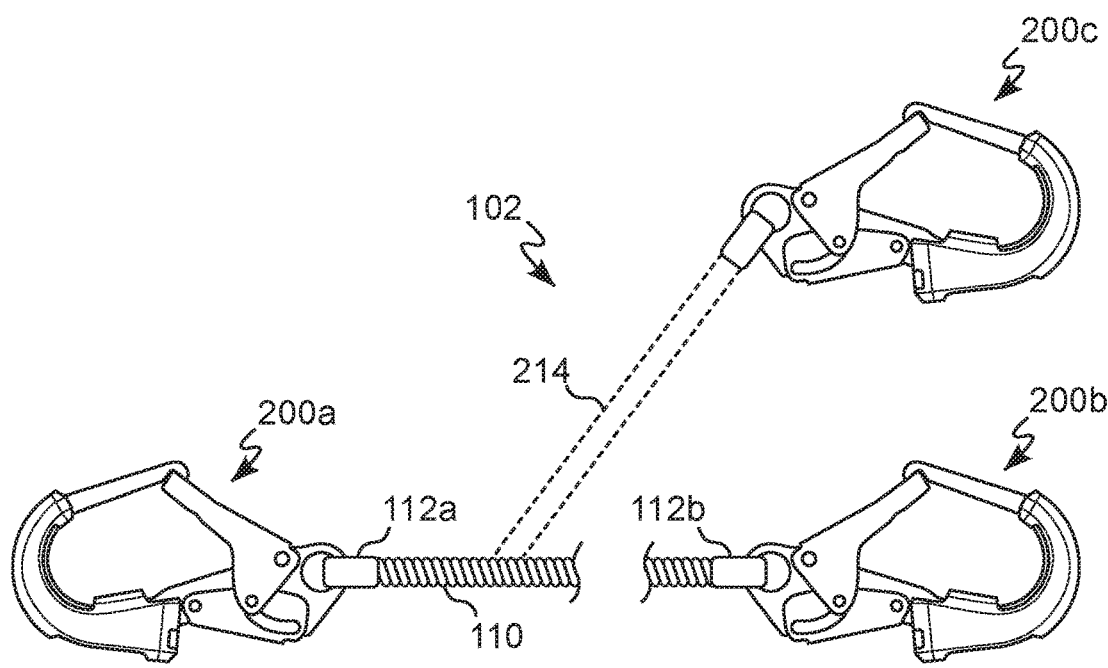
FIG. 2 is a top view of fall protection safety equipment having a connector in accordance with some non-limiting embodiments or aspects of the present disclosure.

With reference to FIG. 2, the fall protection safety equipment 102 is shown separate from the fall protection compliance system 100. The fall protection safety equipment 102 has the first connector 200a connected to a first end 112a of the lanyard 110 and the second connector 200b connected to a second end 112b of the lanyard 110. In some non-limiting embodiments or aspects, the fall protection safety equipment 102 may have a third connector 200c connected to a separate line 114 that is connected to the lanyard 110 between the first end 112a and the second end 112b. As discussed herein, the first connector 200a may be configured for connecting directly to the harness 104 (shown in FIG. 1) or another piece of safety equipment, such as an energy absorber, that is directly connected to the harness 104. The second connector 200b may be configured for connecting directly to the anchor 106 (shown in FIG. 1) or to another piece of safety equipment, such as an energy absorber, that is connected directly to the anchor 106. The third connector 200c may be configured for connecting to a second anchor 106 on the structure S. The third connector 200c may be connected to the second anchor 106 before the second connector 200b is removed from the first anchor 106 to allow the user U to move on the structure S while remaining connected to at least one of the anchors 106. As described herein, at least one of the connectors 200a, 200b, 200c may have one or more sensors configured to detect a connection status that is indicative of whether at least one of the connectors 200a, 200b, 200c is connected to the connection structure, such as the harness 104, the anchor 106, or other connection structure.

Figure 3:
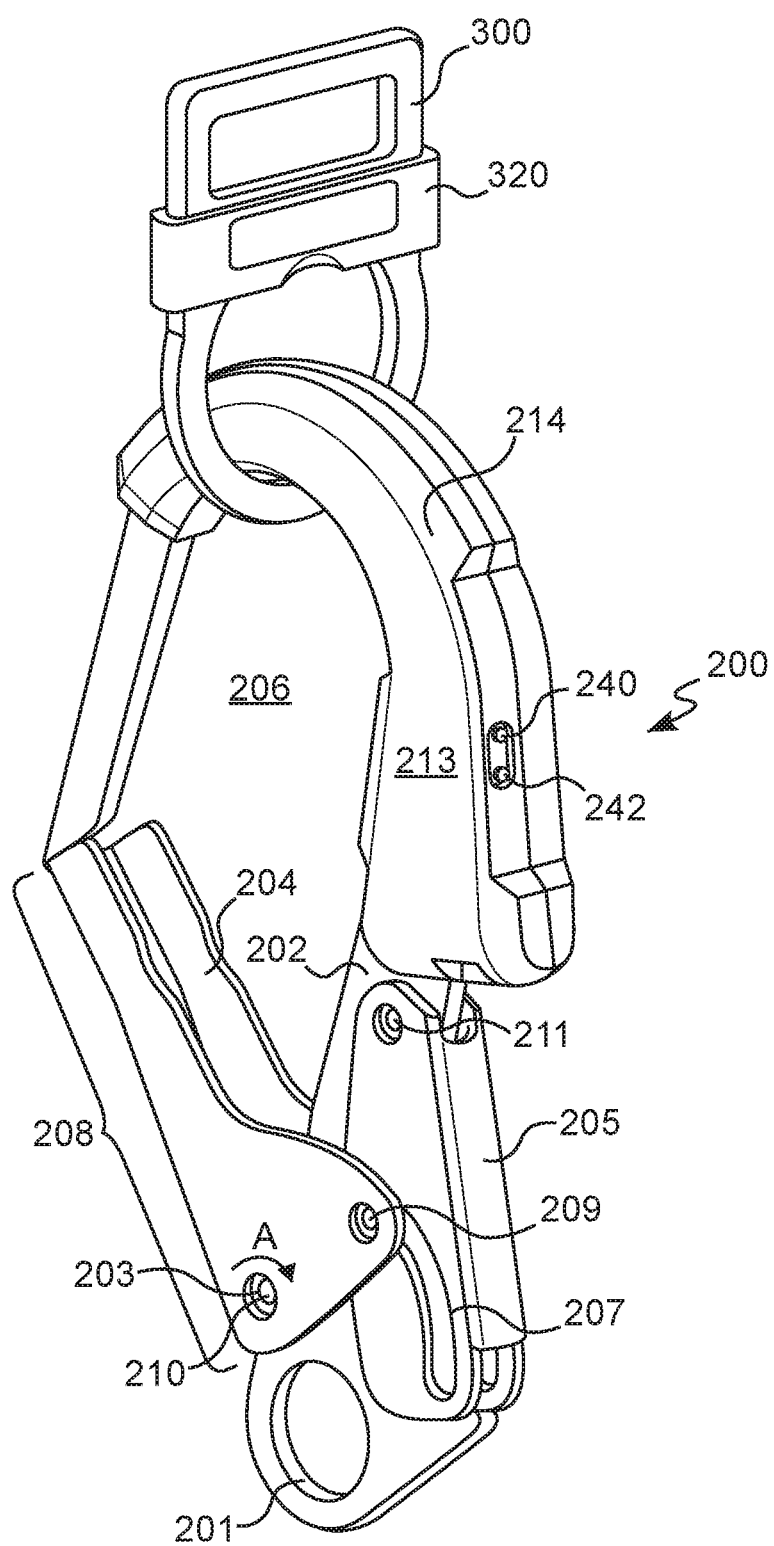
FIG. 3 is a perspective view of one of the connectors shown in FIG. 2 connected to a connection structure.
Figure 4:
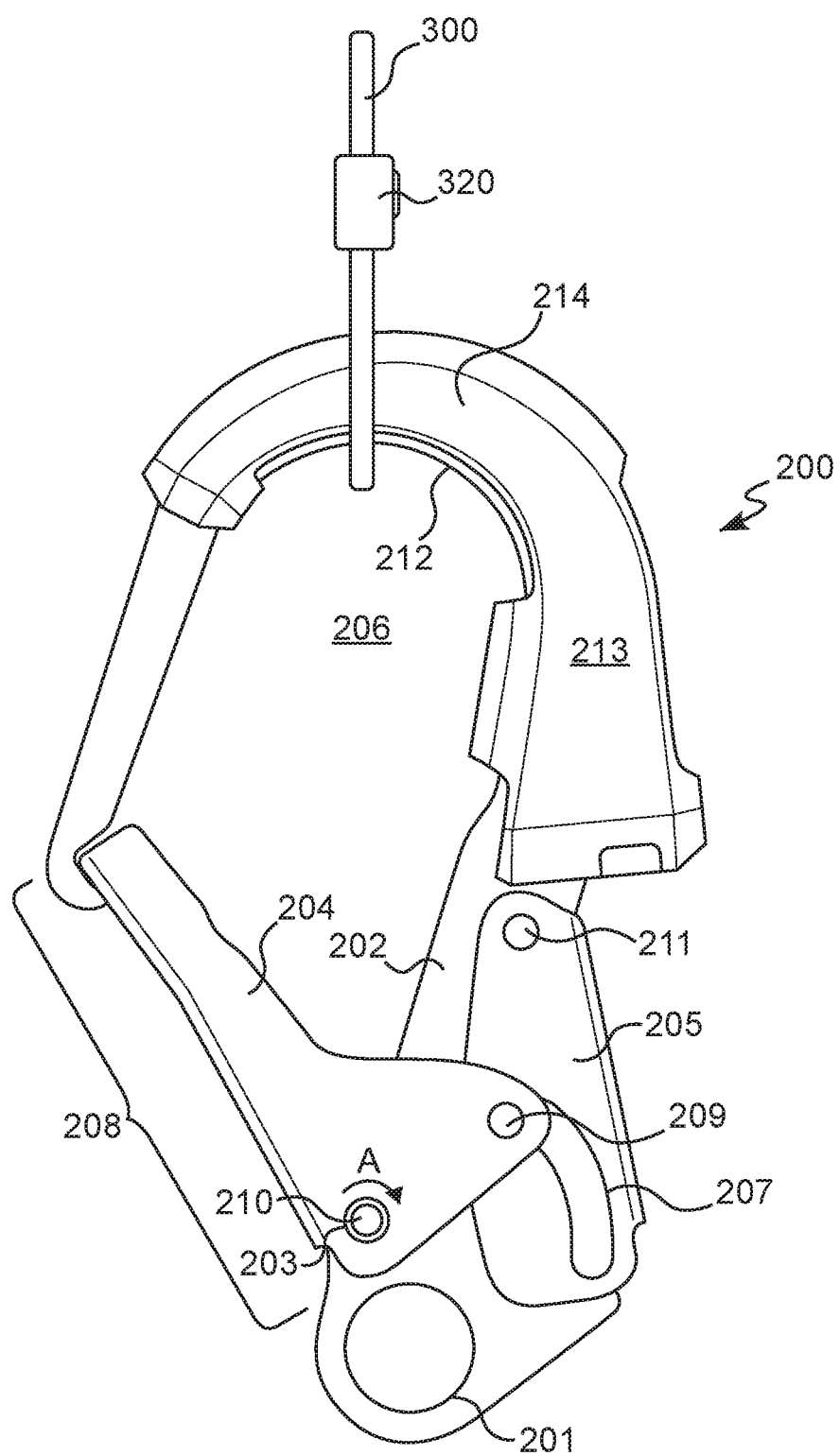
FIG. 4 is a side view of the connector and connection structure shown in FIG. 3.

With reference to FIGS. 3-4, the connector 200 and a connection structure 300 are illustrated in accordance with some non-limiting embodiments or examples of the present disclosure. While FIG. 3 illustrates the connector 200 that is configured as a snap hook, in other non-limiting embodiments or aspects, the connector 200 may be a carabiner or the like. Similarly, while the connection structure 300 is shown as a D-ring, in other non-limiting embodiments or aspects, the connection structure 300 may be a U-bolt or the like. It should be understood that the structures and techniques described herein can be applied to a variety of other devices configured for securing a user U to an anchor 106 as part of a fall protection compliance system 100.

In some non-limiting embodiments or aspects, the connector 200 can be configured for use as an additional component to existing safety equipment, such as by being placed intermediate between the harness 104 and the fall protection safety equipment 102 (shown in FIG. 1), and/or between the anchor 106 and the fall protection safety equipment 102. In such embodiments or aspects, the connector 200 may be positioned intermediate between the D-ring of the harness 104 and the lanyard 110 or other fall protection device 102. In this configuration, the connector 200 may have two connection points to allow connection between the harness 104 and the lanyard 110 such that at least a portion of the connector 200 functions as a load bearing member.

With continued reference to FIGS. 3-4, the connector 200 has a frame 202 configured for connecting the connector 200 to at least a portion of at least one piece of safety equipment, such as the connection structure 300. The frame 202 may have a connection point 201 for connecting the lanyard 110 (shown in FIG. 1) or other piece of fall protection safety equipment to the connector 200. The frame 202 may have a substantially C-shaped structure with an opening 208 extending between two opposed ends of the C-shaped frame 202.

With continued reference to FIGS. 3-4, the connector 200 has a movable gate 204 connected to the frame 202 and movable between a closed position and an open position. In the closed position, such as shown in FIG. 3, the movable gate 204 encloses a connection area 206 to prevent passage of the connection structure 300 or other object through the opening 208 on the frame 202. The movable gate 204 contacts the frame 202 such that a continuous loop encloses the connection area 206 and prevents movement of the connecting structure 300 or other objection into or from the connection area 206. The movable gate 204 may be pivotally or slidably movable to the open position, such as by rotating about a pivot point 210 in a direction of arrow A. With the movable gate 204 in the open position, the opening 208 on the frame 202 is unobstructed to allow passage of the connection structure 300 or other object into and out of the connection area 206.

In some non-limiting embodiments or aspects, the movable gate 204 may be biased to the closed position. For example, a biasing member, such as a spring 203, may be provided to bias the movable gate 204 to the closed position. In some non-limiting embodiments or aspects, one or more sensors may be provided for detecting the open and/or closed position of the movable gate 204, and/or a movement of the movable gate 204 toward or away from the open/closed position. The movable gate 204 may have a locking assembly 205 for maintaining the movable gate 204 in the closed position and/or permitting movement of the movable gate 204 in a direction from the closed position toward the open position. The locking assembly 205 may be operatively connected to the gate 204 and movable between a first position and a second position, wherein, in the first position, the locking assembly 205 is configured for preventing movement of the gate 204 from the closed position toward the open position, and wherein, in the second position, the locking assembly 205 is configured for permitting movement of the gate 204 from the closed position toward the open position. For example, movement of the movable gate 204 from the closed position may be prevented unless the locking assembly 205 is disengaged (i.e., moved from the first position toward the second position). In this manner, inadvertent opening of the movable gate 204 can be prevented. The locking assembly 205 may be connected to the movable gate 204 by way of a channel 207 that slidably receives a pin 209 of the movable gate 204. The locking assembly 205 may be pivotally movable about a second pivot point 211. When a user operates the locking assembly 205 (e.g., the user squeezes the locking assembly 205 against the frame 202), the locking assembly 205 pivotally moves about the second pivot point 211 to allow the pin 209 to move within the channel 207, which thereby permits movement of the movable gate 204 from the closed position toward the open position.

Figure 5:
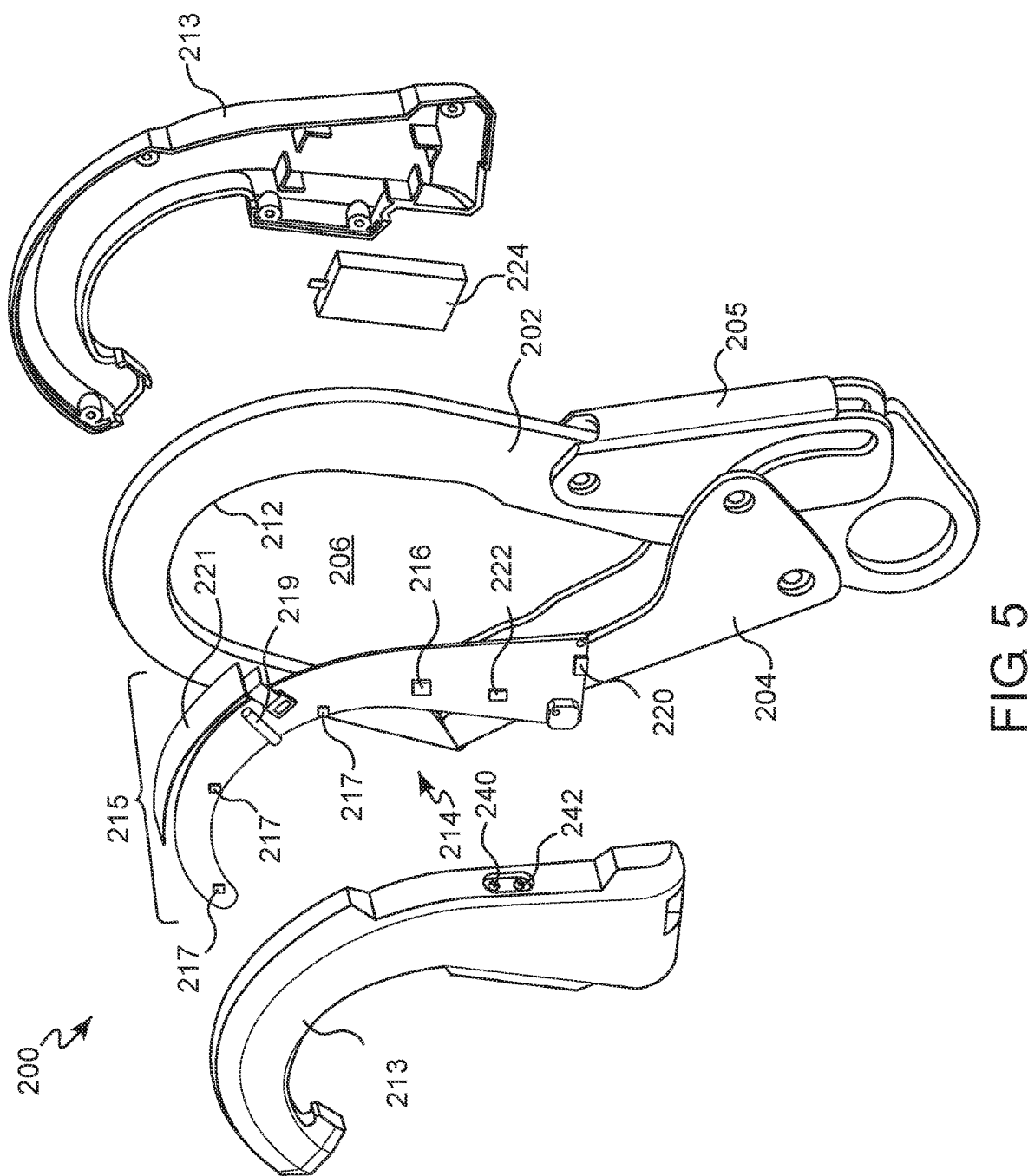
FIG. 5 is an exploded perspective view of the connector shown in FIG. 4.

With reference to FIG. 5, and with continued reference to FIGS. 3-4, the connector 200 has a connection sensor assembly 214 configured for determining a connection status of the connector 200. A connection status generally refers to a determination, using the connection sensor assembly 214, as to whether the connector 200 is connected to a connection structure 300 or disconnected from the connection structure 300. For example, the connection status may indicate that the connector 200 is connected to the connection structure 300, such as when the connection sensor assembly 214 detects the presence of a ferromagnetic material of the connection structure within the connection area 206 and/or detects a presence of an identification element associated with the connection structure 300, as described herein. Alternatively, the connection status may indicate that the connector 200 is disconnected from the connection structure 300, such as when the connection sensor assembly 214 detects an absence of a ferromagnetic material within the connection area 206 and/or detects an absence of an identification element 320 associated with the connection structure 300, as described herein, as described herein.

With continued reference to FIG. 5, the connection sensor assembly 214 is enclosed within a housing 213 connected to the frame 202 of the connector 200. In some non-limiting embodiments or aspects, the housing 213 may have a pair of housing sides that connect to each other to enclose the components of the connection sensor assembly 214. The connection sensor assembly 214 may be configured to detect whether the connector 200 is connected to safety equipment, such as a component of a fall protection compliance system 100. In some non-limiting embodiments or aspects, the connection sensor assembly 214 may be further configured to detect a presence of an identification element associated with the connection structure 300. In some non-limiting embodiments or aspects, the connection sensor assembly 214 may be further configured to detect movement of the connector 200, such as due to movement of the user U to which the connector 200 is directly or indirectly attached. The connection sensor assembly 214 may have one or more sensors, including one or more accelerometers, gyroscopes, pressure sensors, magnetic sensors, contact switches, RFID, NFC, and other radio-based proximity detectors, as discussed herein.

With continued reference to FIG. 5, the connection sensor assembly 214 has one or more sensors 215 and a control device 216 operatively connected to the one or more sensors 215 to receive data from the one or more sensors 215 regarding the connection status of the connector 200. The plurality of sensors 215 may be disposed on a side of the frame 202 or on an inner surface 212 facing the connection area 206. In some non-limiting embodiments or aspects, the inner surface 212 may be a surface of the frame 202 that is configured for contacting the connection structure 300 (shown in FIG. 4) when the connector 200 is connected to the connection structure 300.

In some non-limiting embodiments or aspects, the one or more sensors 215 may include at least one magnetometer 217. In some non-limiting embodiments or aspects, a plurality of magnetometers 217 may be spaced apart in an arcuate arrangement that corresponds to an arcuate shape of the frame 202. The magnetometers 217 may be disposed in an area of the frame 202 that corresponds to a probable location where the connection structure 300 will be located when the connection structure 300 is disposed within the connection area 206 of the connector 200. At least one permanent magnet, such as a rare earth magnet 219, may be associated with at least one magnetometer 217, such as by being disposed between a plurality of magnetometers 217. The rare earth magnet 219 generates a pre-defined magnetic field within at least a portion of the connection area 206. When a ferromagnetic material, such as the ferromagnetic metal material of the connection structure 300 or other ferromagnetic object, is inserted into the connection area 206, the pre-defined magnetic field generated by the rare earth magnet 219 is disturbed by the presence of such a ferromagnetic material. By measuring the disturbance of the pre-defined magnetic field, the connection sensor assembly 214 is configured to detect the connection status of the connector 200, such as whether the connection structure 300 is disposed in the connection area 206 of the connector 200.

With continued reference to FIG. 5, the one or more sensors 215 may include at least one short-range wireless communication antenna 221 configured for detecting a presence or an absence of an identification element 320 on the connection structure 300. In some non-limiting embodiments or aspects, the at least one short-range wireless communication antenna 221 may be an RFID antenna and the identification element 320 may be an RFID tag. In some non-limiting embodiments or aspects, the at least one short-range wireless communication antenna 221 may be configured to interact with the identification element 320 (shown in FIGS. 6A-6B) attached to the connection structure 300. In this manner, when the connection structure 300 having the identification element 320 is connected to the connector 200, the at least one short-range wireless communication antenna 221 detects the presence of the identification tag 320 on the connection structure 300, thereby indicating that the connector 300 is connected to an approved connection structure 300. The at least one short-range wireless communication antenna 221 may be configured as a flex circuit positioned on an upper arcuate portion of the housing 213. In this manner, the at least one short-range wireless communication antenna 221 is positioned closest to a probable location of the identification element 320 when the connection structure 300 is disposed within the connection area 206 of the connector 200.

In various non-limiting embodiments or aspects, sensor detection intervals can be optimized with low duty cycles in order to extend battery life. In this manner, the one or more sensors 215 can be turned on, come to steady state, take a record or data point, and then turn off using a particular cycle. If, for example, one or more sensors 215 can complete its entire cycle within only 100 milliseconds, the connector 200 may have a duty cycle of 1% while generating a data point once every 10 seconds. Depending on the type of sensor used for any of the data acquisition requirements, the sensor data acquisition cycle could be longer or shorter.

The connection sensor assembly 214 may be in a standby or sleep mode prior to connection of the connection structure 300 in order to conserve battery life. In some non-limiting embodiments or aspects, the connection sensor assembly 214 may be activated from the standby or sleep mode by movement of the movable gate 204 and/or the locking assembly 205 from the closed position to the open position. In some non-limiting embodiments or aspects, the connection sensor assembly 214 may be activated from the standby or sleep mode by detecting movement of the connector 200, such as using a gyroscope or an accelerometer. In some non-limiting embodiments or aspects, the connection sensor assembly 214 may be activated from the standby or sleep mode after an initial connection to a connection structure 300 is made. In some non-limiting embodiments or aspects, the connection sensor assembly 214 may be activated from the standby mode by pressing a button, such as a button on the housing 213 of the connector 200. In some non-limiting embodiments or aspects, the connection sensor assembly 214 may be activated from the standby or sleep mode by the user being physically present within a work zone where operation of the connector 200 is desired. For example, the zone may have weight sensors and/or light bar sensors that, once activated due to the user's weight or due to the light beam being broken by the user, an activation signal is sent to the connection sensor assembly 214. The connection sensor assembly 214 may be activated if the user is detected within a predetermined distance of a connection structure where the use of the connector 200 may be required. In further examples, the user may scan into the work area, such as using an RFID tag, and/or the user's presence may be sensed, for example using a sonar or other sensing device, in order to activate the connection sensor assembly 214. In some non-limiting embodiments or aspects, the connection sensor assembly 214 may be activated from the standby or sleep mode when the connector 200 is unplugged from a power source or a home station, such as when the connector 200 is being recharged. Plugging the connector back to the power source or the home station may cause the connection sensor assembly 214 to enter the standby or sleep mode.

Once activated from the standby or sleep mode, the connection sensor assembly 214 may be configured to detect whether a ferromagnetic material, such as the ferromagnetic material of the connection structure 300 is disposed within the connection area 206 of the connector 200 and/or to detect the presence or absence of an identification element associated with the connection structure 300.

In some non-limiting embodiments or aspects, the connector 200 may have a communication interface 220 for communicating information regarding the connection status of the connector 200. In some non-limiting embodiments or aspects, the communication interface 220 may be at least one of a visual, audio, vibration, and tactile indicator on the connector 200 configured for indicating the connection status of the connector 200. For example, the communication interface 220 may be one or more lights 240 that indicate a connected or disconnected status of the connector. The one or more lights 240 may have a first visual indication, such as a green light, indicative of a presence of a ferromagnetic material of the connection structure 300 within the connection area 206 and/or a presence of an identification element 320 on the connection structure 300, and a second visual indication, such as a red light, indicative of an absence of the ferromagnetic material of the connection structure 300 within the connection area 206 and/or an absence of an identification element 320 on the connection structure 300. The first visual indication may be the same or different from the second visual indication.

In some non-limiting embodiments or aspects, the communication interface 220 may be one or more speakers 242 or other audio devices configured to provide a first audio indication, such as a first tone, indicative of a presence of a ferromagnetic material of the connection structure 300 within the connection area 206 and/or a presence of an identification element 320 on the connection structure 300, and a second audio indication, such as a second tone different from the first tone, indicative of an absence of the ferromagnetic material of the connection structure 300 within the connection area 206 and/or an absence of an identification element 320 on the connection structure 300. The first audio indication may be the same or different from the second audio indication.

In some non-limiting embodiments or aspects, the communication interface 220 may be one or more vibration devices configured to provide a first tactile indication, such as a first vibration, indicative of a presence of a ferromagnetic material of the connection structure 300 within the connection area 206 and/or a presence of an identification element 320 on the connection structure 300, and a second tactile indication, such as a second vibration different from the first vibration, indicative of an absence of the ferromagnetic material of the connection structure 300 within the connection area 206 and/or an absence of an identification element 320 on the connection structure 300. The first tactile indication may be the same or different from the second tactile indication.

The communication interface 220 may include a transceiver-like component (e.g., a transceiver, a separate receiver and transmitter, etc.) that enables the control device 216 to communicate with other devices, such as via a wired connection, a wireless connection, or a combination of wired and wireless connections. The communication interface 220 may permit the control device 216 to receive information from another device and/or provide information to another device. For example, the communication interface 220 may include an Ethernet interface, an optical interface, a coaxial interface, an infrared interface, a radio frequency (RF) interface, a universal serial bus (USB) interface, a Wi-Fi® interface, low-energy Bluetooth® interface, a cellular network interface, and/or the like.

At any given change of connection status of the connector 200, a notification may be generated and communicated to the user via the communication interface 220 regarding the current connection state of the connector 200. These notifications can be segregated into several different categories. For example a green light and a short beep may indicate that the connector 200 is connected to an approved connection structure 300 (i.e., a ferromagnetic connection structure 300 having an identification tag 320), while a long tone and a red light may be used to indicate that the connector 200 is not connected to the connection structure 300 and/or that it is connected to a ferromagnetic connection structure 300 that does not have an identification element 320. Other notifications can be generated using various combinations of communication devices associated with the communication interface 220.

In some non-limiting embodiments or aspects, the communication interface 220 may have a transmitter 222 for wirelessly transmitting data regarding the status of the connector 200 to a remote device 250 (shown in FIG. 10), such as a cell phone or a computer terminal, and/or receiving data from the remote device 250 using a wireless communication protocol. Each of the one or more sensors 215 is configured to communicate data, such as sensed motions, events and conditions, via wireless communications. The transmitter 222 may be a short range or long range radio, low-energy Bluetooth® (BLE), near-field communication (NFC), or other transmitter configured to communicate data from the connector 200 continuously or periodically. The connector 200 can be interrogated using short range radio communications, standard networking protocols, direct connection of a port, or the charging connection.

Data recorded by the connector 200 may be transmitted for download by the remote device 250. The transmitted data may include, for example, the time-stamped transitions between all device states, sensor data, and device health status. Once data is downloaded, it can be reviewed by the compliance manager, industrial hygienist or other supervisor personnel. Data may be password protected so that it cannot be overwritten or deleted without being recorded to a permanent record.

In some non-limiting embodiments or aspects, time and date stamps, along with the unit identification number can be transmitted to the remote device 250. In this manner, if the user is in an area where full compliance is expected (both conditions met), but at least one of the conditions is not met, a safety officer can be dispatched to physically inspect the user to determine the cause for non-compliance. In the event of a fall, the connector 200 can be configured to transmit this event to the remote device 250. In some non-limiting embodiments or aspects, the connector 200 may be configured to transmit a distress signal, such as by placing a call to emergency services, in an event that the user is in distress based on the data received from the one or more sensors 215. In some non-limiting embodiments or aspects, the user can activate the connector 200, such as by pushing a button thereon, to transmit an alert that the user requires assistance, such as in an emergency situation.

The connector 200 may be configured to save data having predetermined characteristics, such as when sensor readings exceed a predetermined threshold, or when the one or more sensors 215 detect or fail to detect a condition. In some non-limiting embodiments or aspects, the connector 200 may be configured to save data when both conditions of compliant use of the connector 200 are met, such as when a proper connection is made. In an event that the connector 200 is disconnected from the connection structure 300, the connector 200 may store data regarding such event(s).

In some non-limiting embodiments or aspects, the function of determining compliant use of the connector 200 can be performed externally, such as by the application software used by the remote device 250. In this manner, the information recorded by the connector 200 may be downloaded and evaluated externally to confirm compliance. This function can be carried out on site, remotely using an off-site server or controller, or remotely by reviewing reports submitted by local safety compliance, industrial hygienists, or other safety personnel.

In some non-limiting embodiments or aspects, the connector 200 may be configured for wireless communication prior to issuance to the worker. For example, the connector 200 may be configured to the user, the safety equipment with which the connector 200 is to be used, the work site, area, and/or other data of importance to the safety officer or industrial hygienist. This may be done using a protocol to protect overwriting or editing the data.

With reference to FIG. 5, the control device 216 is operatively connected to the one or more sensors 215 to receive data from the one or more sensors 215 regarding the connection status of the connector 200. A battery 224 may be provided for powering the components of the connector 200. In some non-limiting embodiments or aspects, the battery 224 may be a rechargeable lithium polymer battery pack.

The control device 216 may be configured to use data from at least one of the plurality of sensors 215, such as at least one magnetometer 217 and/or the at least one short-range wireless communication antenna 221, to determine the connection status of the connector 200. For example, the control device 216 may determine that the connector 200 has been connected to the connection structure 300 based on a number of ordered operations, such as by receiving data indicating movement of the movable gate 204 from the closed position to the open position. The control device 216 may further receive data from the one or more magnetometers 217 indicating that the connection structure 300 is disposed within the connection area 206. The control device 216 may further receive data from the at least one short-range wireless communication antenna 221 indicating that the identification element 320 of the connection structure 300 is disposed in proximity of the connector 200.

After determining that the connector 200 is connected to the connection structure 300, such as by detecting the presence of the ferromagnetic material of the connection structure 300 within the connection area 206 of the connector 200 and/or detecting the presence of the identification element 320 of the connection structure 300 in proximity of the at least one short-range wireless communication antenna 221 of the connector 200, the control device 216 may be configured to indicate that a proper connection has been made, such as by generating an audible, visual, or a tactile alert. For example, if the connector 200 is connected to the connection structure 300, such as by detecting the presence of the ferromagnetic material of the connection structure 300 within the connection area 206 of the connector 200, and the at least one short-range wireless communication antenna 221 detects the presence of the identification element 320 that is an expected identification element (i.e., the identification element 320 corresponding to the connection structure 300 to which the connector 200 is supposed to be connected to), the control device 216 may be configured to actuate the communication interface 220 to display a first light (such as a green status light), and/or to emit a first sound, and/or to generate a first tactile response.

If the control device 216 determines that the connector 200 is not connected to the connection structure 300, such as by failing to detect the presence of the ferromagnetic material of the connection structure 300 within the connection area 206 of the connector 200 and/or failing to detect the presence of the identification element 320 of the connection structure 300 in proximity of the at least one short-range wireless communication antenna 221 of the connector 200, the control device 216 may be configured to indicate that an improper connection has been made, such as by generating an audible, visual, or a tactile alert. For example, if the connector 200 is not connected to a connection structure or is connected to a ferromagnetic material that is not an approved connection structure 300, and/or if the at least one short-range wireless communication antenna 221 fails to detect the presence of the identification element 320 or if the at least one short-range wireless communication antenna 221 detects an unexpected identification element (i.e., the identification element 320 corresponding to the connection structure 300 to which the connector 200 is not supposed to be connected to), the control device 216 may be configured to actuate the communication interface 220 to display a second light (such as a red status light), and/or to emit a second sound, and/or to generate a second tactile response, wherein the second light, the second sound, and the second tactile response are different from the first light, the first sound, and the first tactile response, respectively.

Figure 6A:
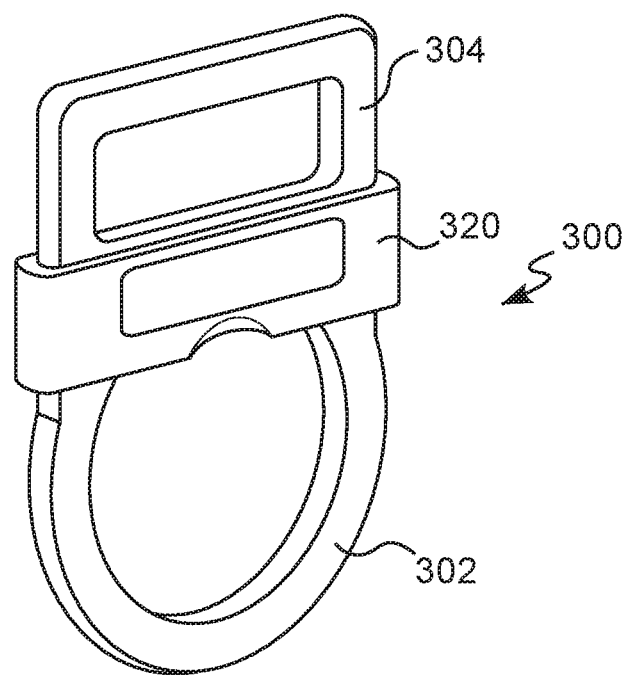
FIG. 6A is a perspective view of a connection structure in accordance with some non-limiting embodiments or aspects of the present disclosure.
Figure 6B:
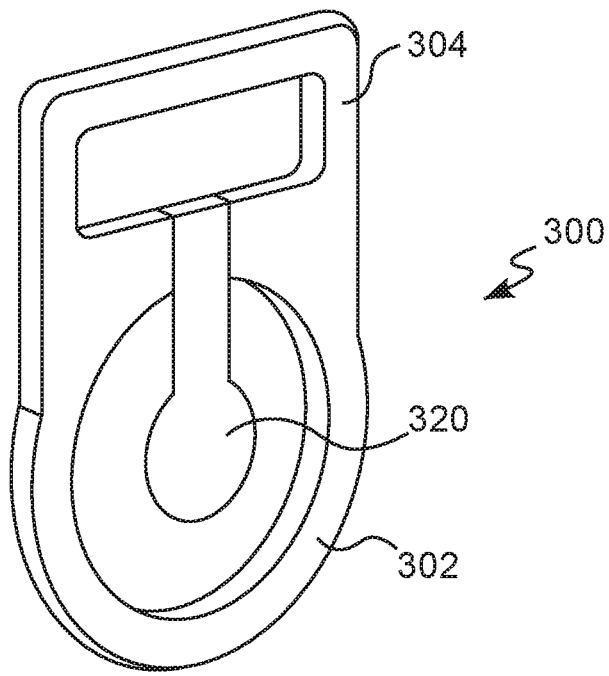
FIG. 6B is a perspective view of a connection structure in accordance with some non-limiting embodiments or aspects of the present disclosure.

With reference to FIGS. 6A-6B, in some non-limiting embodiments or aspects, the connection structure 300 may be a D-ring connected to an anchor or a harness. The connection structure 300 may be made from a ferromagnetic material and the connector 200 may be configured to detect whether a connection is made with the connection structure 300, such as by detecting a presence of a magnetic field, as described herein.

With continued reference to FIGS. 6A-6B, the connection structure 300 has a connection loop 302 that is configured for being received within the connection area 206 of the connector 200 when the movable gate 204 is in the open position. The connection structure 300 further has an anchor point 304 configured as a separate loop for connecting to an anchor. The identification element 320 may be connected to at least a portion of the connection structure 300. In some non-limiting embodiments or aspects, such as shown in FIG. 6A, the identification element 320 is connected proximate to the anchor point 304 and away from the connection loop 302 in order to prevent damage to the identification element 320 due to contact with the frame 202 of the connector 200. In some non-limiting embodiments or aspects, such as shown in FIG. 6B, the identification element 320 may be provided on a deflectable element 322 that is positioned within the connection loop 302. In this manner, connection of the connector 200 to the connection loop 302 deflects the deflectable element 322 such that the identification element 320 is positioned proximate to the connection sensor assembly 214. For example, the identification element 320 may directly contact at least a portion of the connection sensor assembly 214, such as by contacting the housing 213 of the connection sensor assembly 214.

Figure 7:
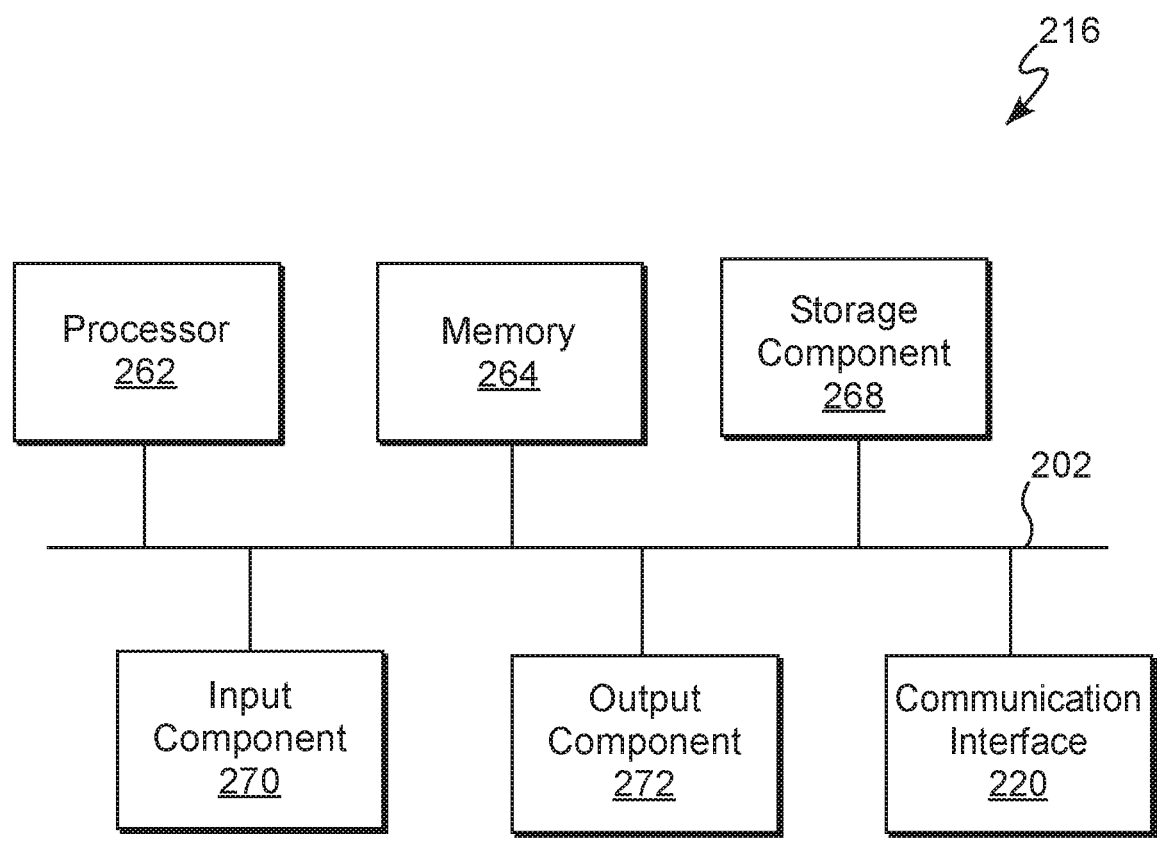
FIG. 7 is an illustration of a fall protection compliance system in accordance with some non-limiting embodiments or aspects of the present disclosure.

Referring now to FIG. 7, illustrated is a diagram of example components of the control device 216. As shown in FIG. 7, control device 216 may include a bus 260, at least one processor 262, memory 264, storage component 268, input component 270, output component 272, and communication interface 220.

Bus 260 may include a component that permits communication among the components of the control device 216. In some non-limiting embodiments or aspects, processor 262 may be implemented in hardware, firmware, or a combination of hardware and software. For example, processor 262 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 264 may include random access memory (RAM), read-only memory (ROM), and/or another type of dynamic or static storage device (e.g., flash memory, magnetic memory, optical memory, etc.) that stores information and/or instructions for use by processor 262.

The storage component 268 may store information and/or software related to the operation and use of the control device 216. For example, the storage component 268 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

The input component 270 may include a component that permits the control device 216 to receive information, such as via user input (e.g., a touchscreen display, a keyboard, a keypad, a mouse, a button, a switch, a microphone, a camera, etc.). Additionally or alternatively, input component 270 may include a sensor for sensing information (e.g., a global positioning system (GPS) component, an accelerometer, a gyroscope, an actuator, etc.). Output component 272 may include a component that provides output information from the control device 216 (e.g., a display, a speaker, one or more LEDs, etc.).

The control device 216 may perform one or more processes described herein. The control device 216 may perform these processes based on the processor 262 executing software instructions stored by a computer-readable medium, such as the memory 264 and/or the storage component 268. A computer-readable medium (e.g., a non-transitory computer-readable medium) is defined herein as a non-transitory memory device. A memory device includes memory space located inside of a single physical storage device or memory space spread across multiple physical storage devices.

Software instructions may be read into the memory 264 and/or the storage component 268 from another computer-readable medium or from another device via the communication interface 220. When executed, software instructions stored in the memory 264 and/or the storage component 268 may cause the processor 262 to perform one or more processes described herein. Additionally or alternatively, hardwired circuitry may be used in place of or in combination with software instructions to perform one or more processes described herein. Thus, embodiments or aspects described herein are not limited to any specific combination of hardware circuitry and software.

The memory 264 and/or the storage component 268 may include data storage or one or more data structures (e.g., a database, and/or the like). The control device 216 may be capable of receiving information from, storing information in, communicating information to, or searching information stored in the data storage or one or more data structures in the memory 264 and/or the storage component 268. For example, the information may include input data, output data, or any combination thereof.

The number and arrangement of components shown in FIG. 7 are provided as an example. In some non-limiting embodiments or aspects, the control device 216 may include additional components, fewer components, different components, or differently arranged components than those shown in FIG. 7. Additionally or alternatively, a set of components (e.g., one or more components) of the control device 216 may perform one or more functions described as being performed by another set of components of the control device 216.

Figure 8:
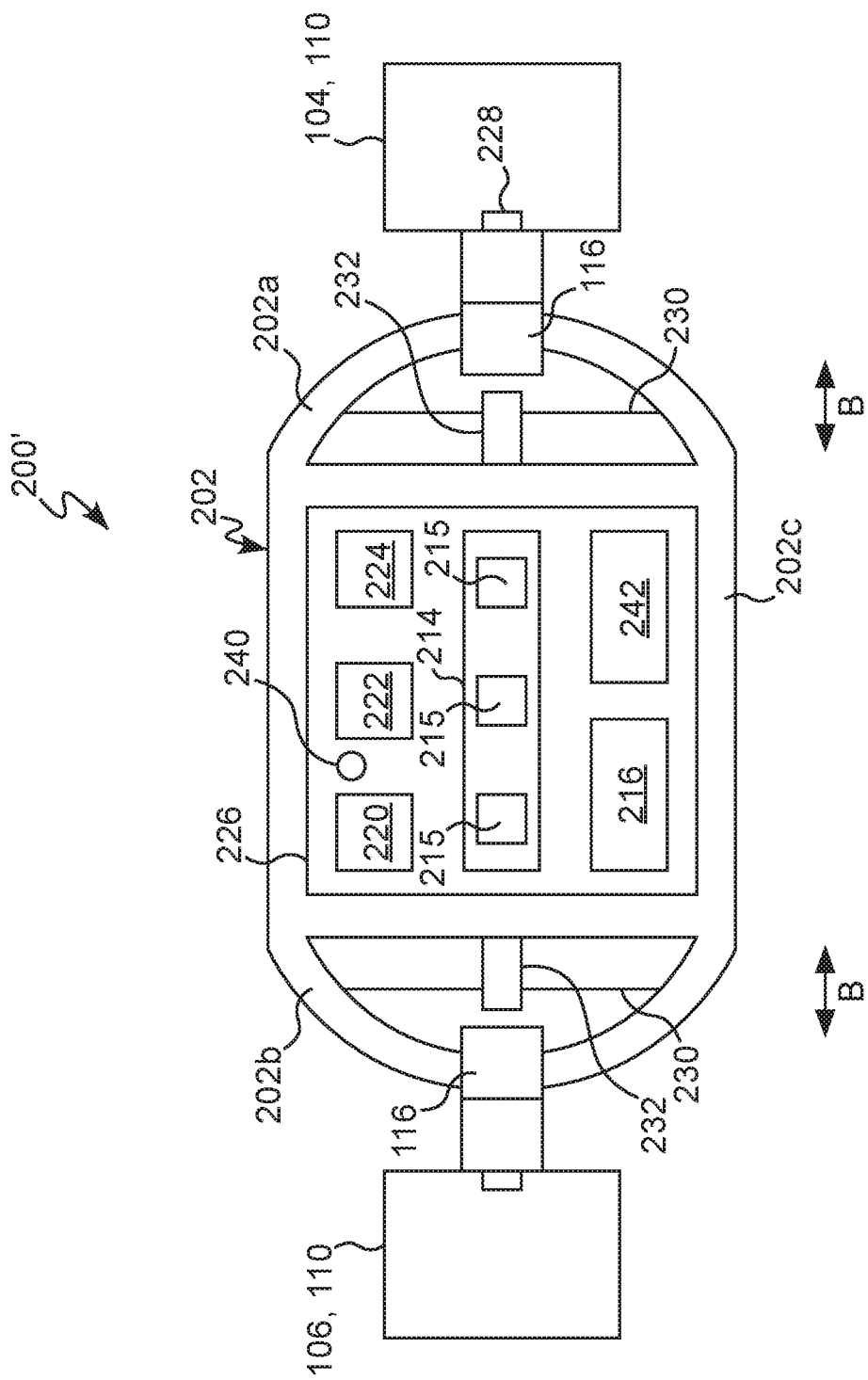
FIG. 8 is an illustration of a fall protection compliance system in accordance with some non-limiting embodiments or aspects of the present disclosure.
Figure 9:
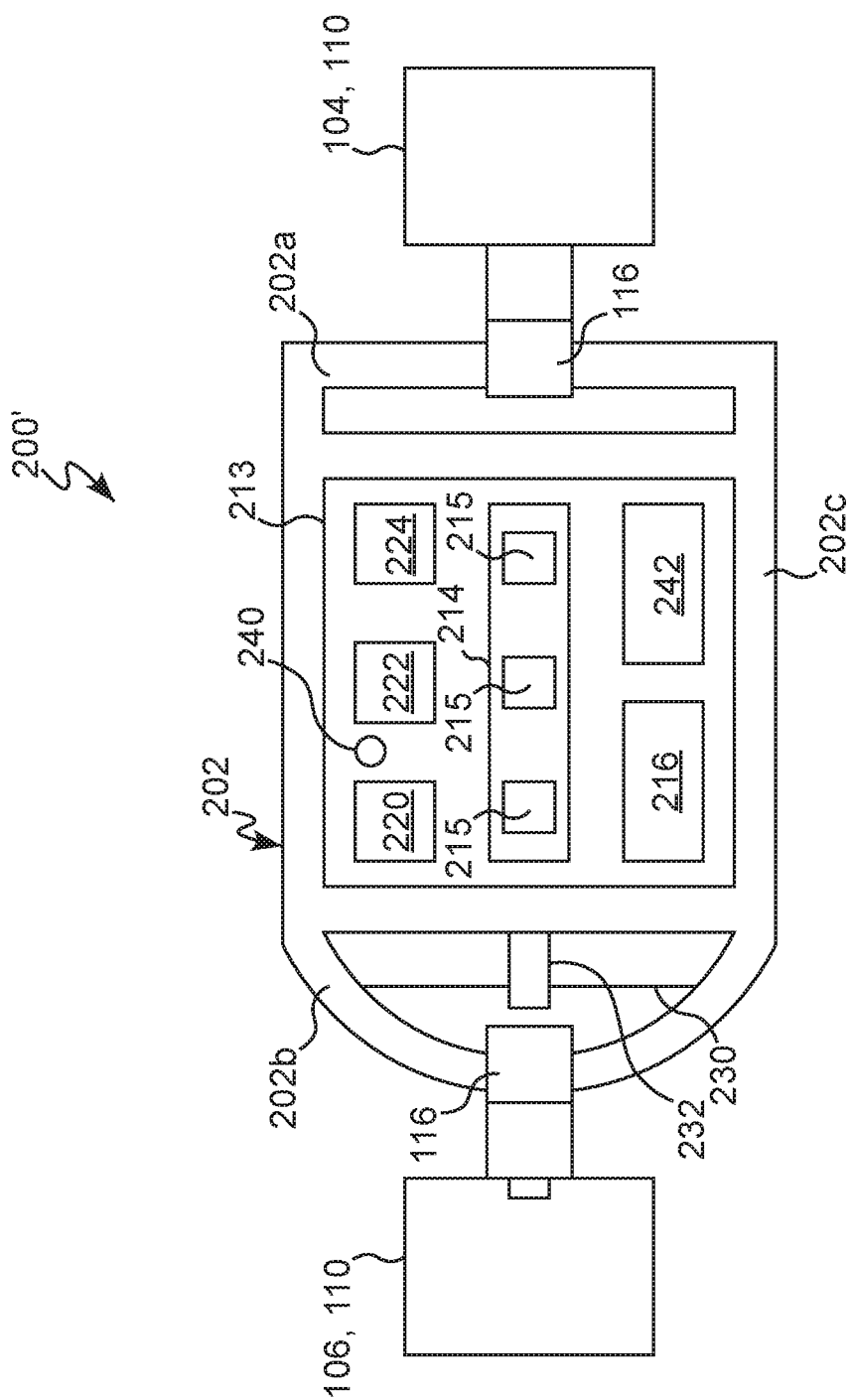
FIG. 9 is a diagram of some non-limiting embodiments or aspects of a fall protection compliance system.

With reference to FIGS. 8-9, a connector 200' is shown in accordance with some non-limiting embodiments or aspects of the present disclosure. The components of the connector 200' shown in FIGS. 8-9 are substantially similar or identical to the components of the connector 200 described herein with reference to FIGS. 3-5. Reference numerals in FIGS. 8-9 are used to illustrate identical components of the corresponding reference numerals in FIGS. 3-5. As the previous discussion regarding the connector 200 generally shown in FIGS. 3-5 is applicable to the connector 200' shown in FIGS. 8-9, only the relative differences between the two connectors are discussed hereinafter.

With reference to FIG. 8, the frame 202 has a first end 202a configured for connecting to a first piece of safety equipment, such as a safety harness 104 or a lanyard 110, and a second end 202b configured for connecting to a second piece of safety equipment, such as the lanyard 110 or anchor 106 (shown in FIG. 1). In some non-limiting embodiments or aspects, the connector 200' is configured to be attached directly to the front/rear portion of safety harness 104 by way of a ventral/dorsal D-ring. The first and second ends 202a, 202b of the frame 202 may be configured as D-rings (FIG. 8) to allow connection to components of a fall protection assembly via a connection element 116, such as a carabiner or a snap hook (not shown). In other embodiments or aspects, such as shown in FIG. 9, one of the first and second ends 202a, 202b may be a D-ring, while the other of the first and second ends 202a, 202b may be a slot configured for receiving, for example, a strap of the safety harness 104, to allow the connector 200' to be directly integrated with the safety harness 104.

With continued reference to FIGS. 8-9, the frame 202 of the connector 200' may be made from metal. The frame 202 may be a forging or casting that has a central section 202c for mounting the components of the connector 200' that are covered by the housing 213 enclosing additional components of the connector 200'. In some non-limiting embodiments or aspects, the housing 213 may be a cover formed from an epoxy or other fluid that hardens so that the components within the housing 213 cannot be damaged by normal usage and handling. In other embodiments or aspects, the housing 213 is a rigid cover that is removably or non-removably connected to the frame 202. When the frame 202 is configured for use as a load-bearing component, the entire frame 202 may be configured to withstand a minimum force of 5000 lbs or 22 kN of force for repeated drop test.

With continued reference to FIGS. 8-9, the sensor assembly 214 may be configured to detect whether the connector 200' is connected to safety equipment, such as a component of a fall protection assembly. In some non-limiting embodiments or aspects, the one or more sensors 215 may be configured to detect whether the first end 202a of the frame 202 of the connector 200' is connected to the D-ring 108 of the harness 104 and whether the second end 202b of the frame 202 is connected to the lanyard 110. Connection between the connector 200' and a component of the fall protection assembly, such as the harness 104 or the lanyard 110, may be made by way of loops, D-rings, carabiners, locking snap hooks, or other connection mechanisms. With each of these connection mechanisms, the one or more sensors 215 of the connector 200' is configured to detect whether a proper connection is made between these components and the first and second ends 202a, 202b of the frame 202.

In some non-limiting embodiments or aspects, the one or more sensors 215 is a Hall effect sensor configured for detecting whether the connector 200' is connected to a piece of safety equipment. The Hall Effect sensor may be mounted flush with an outside surface of the housing 213. The Hall Effect sensor may be surrounded by or positioned proximate to a magnetic surface. This magnetic surface may be configured to interact with a magnet 228 that is attached to a portion of a fall protection assembly, such as the safety harness 104 and the lanyard 110. In some non-limiting embodiments or aspects, the separate magnets 228 may be permanently secured to the lanyard 110 and the harness 104 by way of a cable and grommet, or by way of a riveted connection.

When the user connects the D-ring of the safety harness 104 to the lanyard 110 or other device, the connector 200' is disposed therebetween such that the magnet 228, either automatically or with additional guidance from the user, aligns and connects to the magnetic surface of the Hall effect sensor. This action changes the state of the Hall Effect sensor and indicates that the safety harness 104 is connected to the lanyard 110 via the connector 200'. The length of the cable connected to the magnet 228 is only as long as the distance between the Hall Effect sensor on the connector 200' and its cabled anchor point on the lanyard 110. The cable is sufficiently strong as to align with the connector 200', but flexible enough to bend as the connector 200' is in use and the magnet is strong enough to stay attached under normal motion of the worker throughout the work day. The Hall Effect sensor may also be incorporated with the connection sensor assembly 214 described herein with reference to FIGS. 3-5.

In some non-limiting embodiments or aspects, the one or more sensors 215 may be a strain gauge configured to detect connection of the safety harness 104 to the lanyard 110 or other safety equipment by way of pull strain at the connection interface of these components. One end of the strain gauge may be connected to a fixed anchor point or on the harness 104, while the other end of the strain gauge may be connected to the lanyard 110. In this manner, the connection of the lanyard 110 to the harness 104 is detected due to a strain reading on the strain gauge of the connector 200'. The strain gauge may also be incorporated with the connection sensor assembly 214 described herein with reference to FIGS. 3-5.

In some non-limiting embodiments or aspects, the one or more sensors 215 may be a contact switch configured to detect connection of the safety harness 104 to the lanyard 110 or other fall protection device. The contact switch may have a shield or arm that prevents a carabiner or other device to connect to the D-ring of the harness 104 or the connector 200' without tripping the switch. The switch may be part of an assembly including an arm that partially covers the area within the D-ring. When the connector 200' connects to the D-ring of the harness 104, the arm or shield is moved away from its home position, thereby causing the switch to open or close depending on its configuration to indicate that a connection has been made between the D-ring of the harness 104 and the connector 200'. A similar connection mechanism may exist between the lanyard 110 or other fall protection device and the connector 200'. The contact switch may also be incorporated with the connection sensor assembly 214 described herein with reference to FIGS. 3-5.

In some non-limiting embodiments or aspects, the one or more sensors 215 may be configured to detect movement of the connector 200', such as due to movement of the worker. In such embodiments or aspects, the one or more sensors 215 may be a gyroscope and/or an accelerometer. The gyroscope and/or accelerometer may also be incorporated with the connection sensor assembly 214 described herein with reference to FIGS. 3-5.

In further embodiments or aspects, the one or more sensors 215 may include a gyroscope, an accelerometer, and a Hall Effect sensor. In this configuration, the gyroscope and accelerometer are configured for detecting a near zero acceleration event (fall), a high acceleration event (fall arrest), motion or lack of motion, and worker orientation. The accelerometer may be configured to detect motion even if the worker is in a relatively static position such as when the worker is seated, kneeling, or in a prostrate position. The Hall Effect sensor may detect whether the connector 200' is connected to or disconnected from the fall protection assembly, as described herein. For example, in an event of a fall from an elevated surface, the unit connector 200' may be configured to record the time and date of the event, along with the orientation and motion of the worker prior to, during, and after the fall event. In this way, specific alarms can be configured, broadcast, and recorded, regarding the state of the worker as being in distress or being able to recover from a possible fall event. If the accelerometers or gyroscopes show accelerations other than that of just gravity (e.g. the unit is NOT at rest, but is moving) then a second condition of compliant use of the connector 200' is met. In any embodiment or aspect where the one or more sensors includes an accelerometer or a gyroscope, data from these sensors can be used to show a pattern of use or behavior regarding the device over time. In embodiments or aspects where the connector 200' has a gyroscope, the initial orientation of the gyroscope can be determined and saved as a baseline orientation. Deviation in orientation from this baseline orientation can be used for generating an alert that the user may have fallen or is in a situation where assistance may be required. The combined gyroscope, an accelerometer, and a Hall Effect sensor may also be incorporated with the connection sensor assembly 214 described herein with reference to FIGS. 3-5.

In some non-limiting embodiments or aspects, the loop-shaped first and second ends 202a, 202b of the connector 200' may have a retractable cover panel 230 movable between a retracted position and an extended position. In the retracted position, the loop-shaped ends 202a, 202b are open to allow connection of the connector 200' to another device, such as the D-ring of the harness 104 or the lanyard 110. In the extended position, the loop-shaped ends 202a, 202b are covered to prevent connection of such devices to the connector 200'. The retractable panel 230 may be configured to be automatically moved from the extended position to the retracted position when a D-ring, carabiner or other connector used in fall protection applications is attached to either end 202a, 202b.

The retractable panel 230 may be connected to a sensor, such as a mechanical, electrical, or an optical sensor, that is configured to detect the position of the cover panel 230, such as the retracted position, the extended position, or an intermediate position between the extended position and the retracted position. In some non-limiting embodiments or aspects, connection of the D-ring, carabiner or other connector used in fall protection applications to the connector 200' may move the panel 230 from the extended to the fully retracted position in a direction of arrow B in FIG. 8, thereby indicating a proper connection. The panel 230 may be biased to the extended position by a biasing mechanism, such as a spring. If the panel 230 is moved to the intermediate position, this may indicate that an improper connection is made or that an improper connector is connected to the connector 200'. The connector 200' may be configured to detect whether a connection has been made to one or both of the ends 202a, 202b of the frame 202 based on a position of the panel 230. If the connector 200' detects that both ends 202a, 202b are connected to a respective connector, this information may indicate a first condition of compliant use of the connector 200'.

In some non-limiting embodiments or aspects, a deflectable element 232, such as a paddle, may be disposed within an open area of the first and second ends 202a, 202b of the frame 202 of the connector 200'. The deflectable element 232 may be configured to pivot around the axis that is perpendicular to the housing 213 between an undeflected, or closed position and a deflected, or open position. The deflectable element 232 may be biased to the closed position by a biasing mechanism, such as a spring. The deflectable element 232 may interact directly or indirectly with a switch, such as a contact, optical, magnetic or other type of switch. In some non-limiting embodiments or aspects, the switch may be a non-contact type such that the housing 213 can be completely sealed from the surrounding environment. When a connection is made to the first or second end 202a 202b of the frame 202, the deflectable element 232 is moved from its initial position to a second, deflected position. The connector 200' may be configured to detect whether a connection has been made to one or both of the ends 202a, 202b of the frame 202 based on a position of the deflectable element 232. If the connector 200' detects that both ends 202a, 202b are connected to a respective connector, this information may indicate a first condition of compliant use of the fall protection assembly.

The connector 200' may be configured to store data received from one or more sensors 215, along with time, date, and/or location data associated with data received from one or more sensors 215. The connector 200' may have an acquisition mode wherein data received by one or more sensors 215 is stored in system memory along with a time, date, and/or location stamp. When in the acquisition mode, the connector 200' may store any conditional change of the one or more sensors 215, along with a time, date, and/or location stamp. For example, turning the connector 200' on and placing it in the acquisition mode may save in the system memory an initial time, date, and/or location stamp. Connection of one end 202a, 202b of the frame 202 to a connector generates a conditional change in the one or more sensors 215, which is saved in the system memory along with the time, date, and/or location stamp associated with such conditional change. Similarly, if the connector 200' is in motion due to movement of the worker, such conditional change may be saved in the system memory along with the time, date, and/or location stamp associated with such conditional change. Data recorded to system memory can be organized in any manner of logs or intervals from minutes, hours, shifts, days, weeks, or similar.

Figure 10:
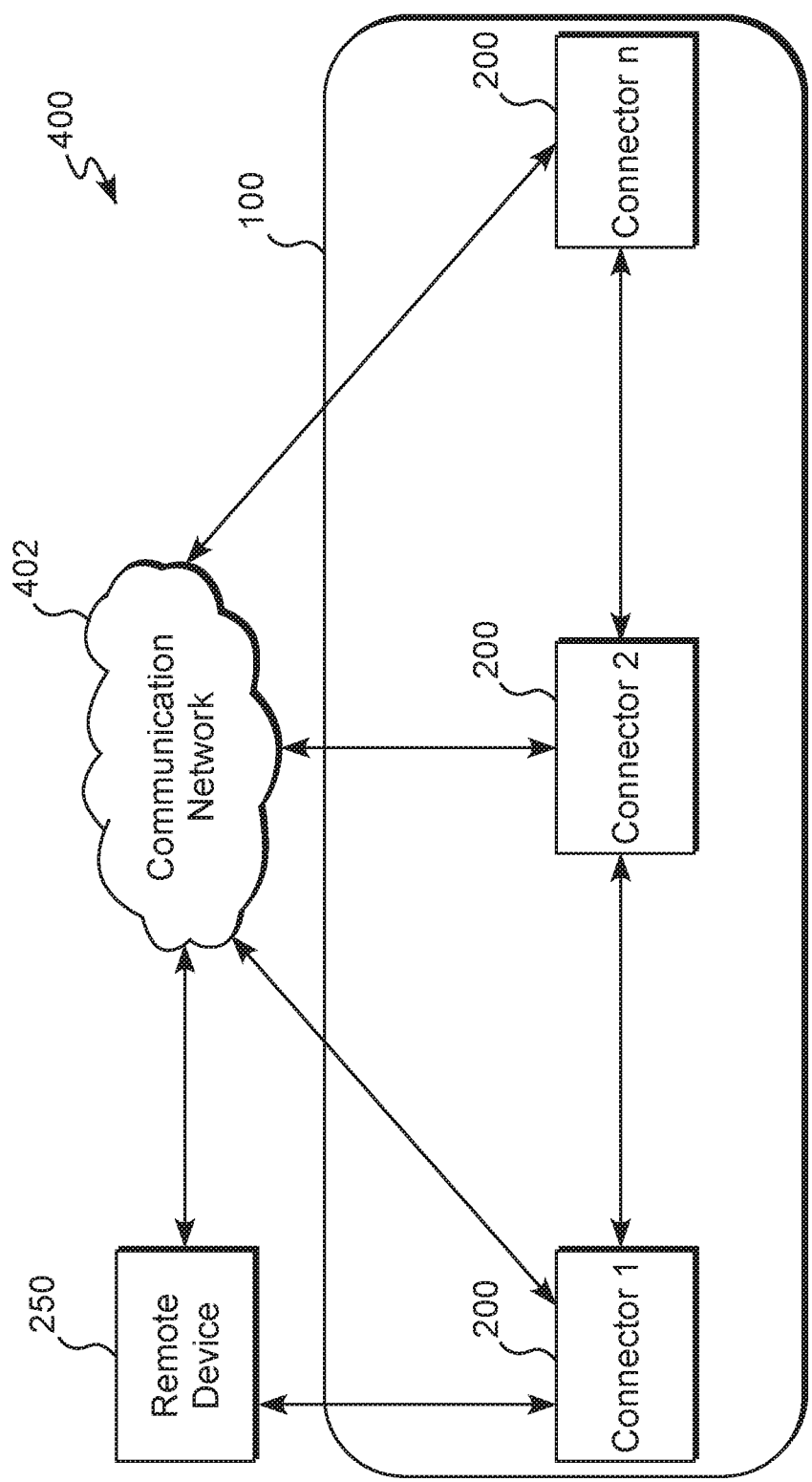
FIG. 10 is a diagram of components of a connection sensor assembly in accordance with some non-limiting embodiments or aspects of the present disclosure.

Referring now to FIG. 10, FIG. 10 is a diagram of an example environment 400 in which the fall protection compliance system 100 described herein may be implemented. As shown in FIG. 10, environment 400 includes the fall protection compliance system 100, which may include a plurality of connectors 200, various pieces of safety equipment, such as lanyards, to which the connectors 200 may be connected, a plurality of anchors having one or more connection structures 300 with identification elements 320. In some non-limiting embodiments or aspects, the environment 400 may correspond to a construction site where a plurality of users may be assigned to work. The environment 400 may further include a communication network 402, and one or more remote devices 250 configured to communicate via one-way or two-way communication with the connectors 200 of the fall protection compliance system 100 using the communication network 402. In some non-limiting embodiments or aspects, the plurality of connectors 200 may be configured to communicate with each other using the communication network 402. The remote device(s) 250 and the connectors 200 may interconnect (e.g., establish a connection to communicate, and/or the like) via wired connections, wireless connections, or a combination of wired and wireless connections using the communication network 402.

In some non-limiting embodiments or aspects, the environment 400 allows authorized users to perform preventive occupational health and safety actions and manage inspections and maintenance of safety equipment. Each remote device 250 may be configured to transmit and/or receive data to and/or from the connectors 200 of the fall protection compliance system 100 via a short-range wireless communication connection (e.g., an NFC communication connection, an RFID communication connection, a Bluetooth® communication connection, and/or the like). In some non-limiting embodiments or aspects, the remote device 250 may be associated with a user (e.g., a safety manager).

Communication network 402 may include one or more wired and/or wireless networks. For example, the communication network 402 may include a cellular network (e.g., a long-term evolution (LTE) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN)), a short-range wireless communication network (e.g., an NFC communication network, an RFID communication network, a Bluetooth® communication network, and/or the like), a private network, an ad hoc network, an intranet, the Internet, a fiber optic-based network, a cloud computing network, and/or the like, and/or a combination of some or all of these or other types of networks.

The number and arrangement of systems and/or devices shown in FIG. 10 are provided as an example. There may be additional systems and/or devices, fewer systems and/or devices, different systems and/or devices, or differently arranged systems and/or devices than those shown in FIG. 10. Furthermore, two or more systems and/or devices shown in FIG. 10 may be implemented within a single system or a single device, or a single system or a single device shown in FIG. 10 may be implemented as multiple, distributed systems or devices. Additionally, or alternatively, a set of systems or a set of devices (e.g., one or more systems, one or more devices) of the environment 400 may perform one or more functions described as being performed by another set of systems or another set of devices of the environment 400.

Figure 11:
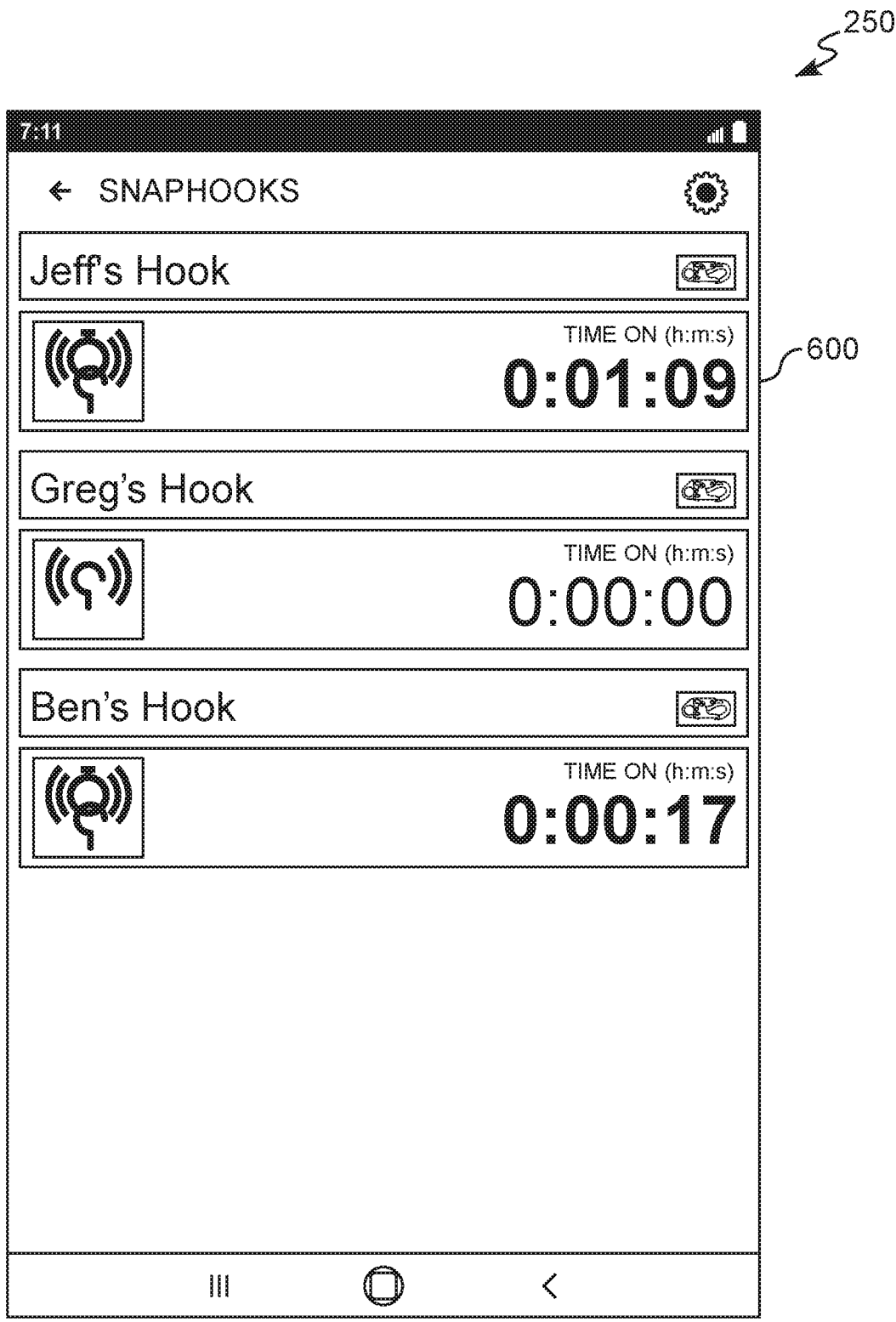
FIG. 11 is an illustration of a graphical user interface for use with a fall protection compliance system in accordance with some non-limiting embodiments or aspects of the present disclosure.
Figure 12:
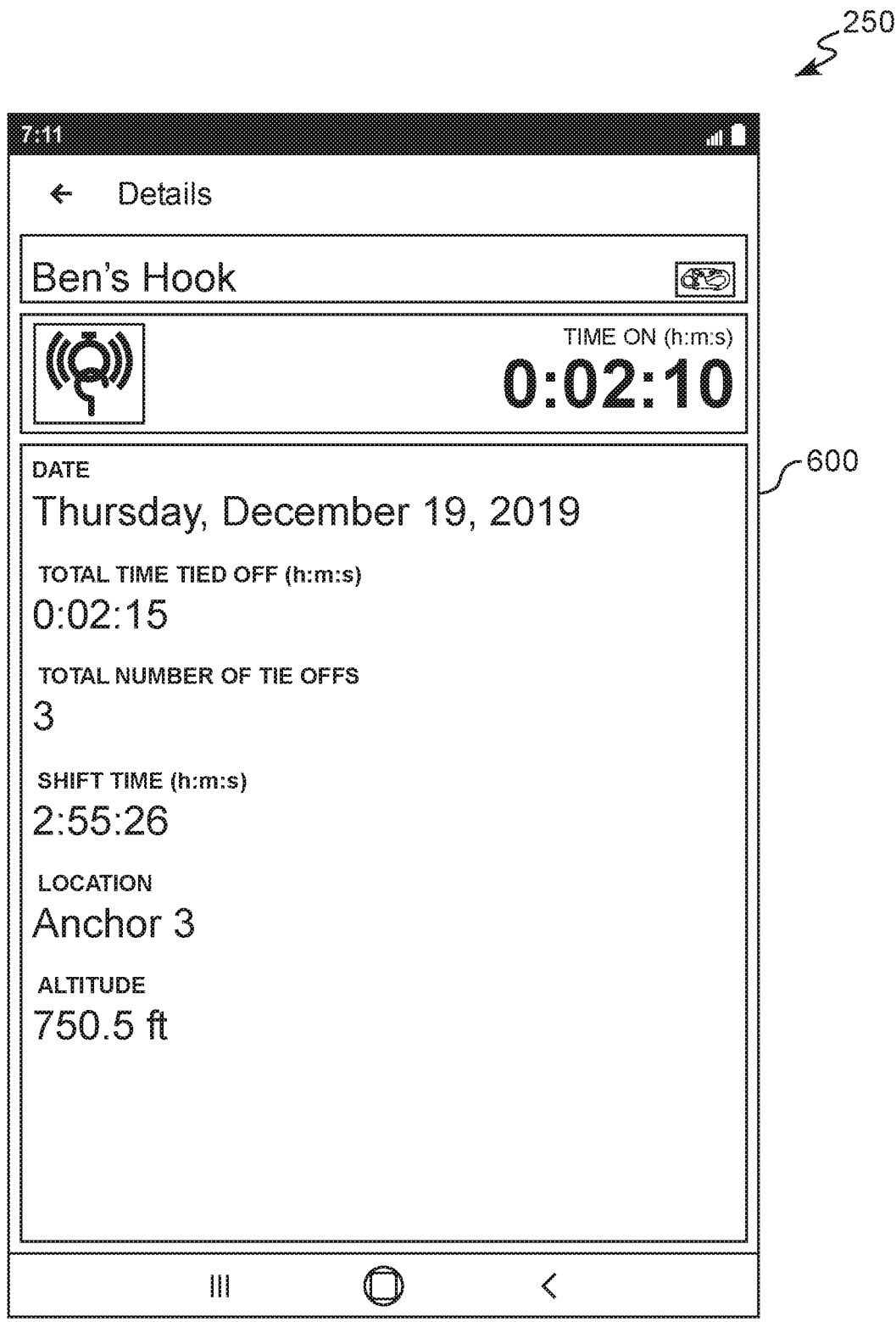
FIG. 12 is an illustration of a graphical user interface for use with a fall protection compliance system in accordance with some non-limiting embodiments or aspects of the present disclosure.

With reference to FIGS. 11-12, data received by the remote device 250 may be displayed on a graphical user display 600 for review by the compliance manager, industrial hygienist or other supervisor personnel. The received data may include, for example, the time-stamped transitions between all device states, sensor data, and device health status. For example, as shown in FIG. 11, the display 600 may include information regarding the connection status of each connector that is part of the fall protection compliance system 100. In some non-limiting embodiments or aspects, such as shown in FIG. 12, the display 600 may include information regarding the user's name or the connector name, battery life, time of current connection, current date and time, total time tied off (accumulated since the connector was turned on), total number of times the connector has been tied off, total time (accumulated since the device was turned on), location of specific connecting structure that the connector is connected to (dictated by the RFID tag), altitude (dictated by an altimeter on the device board), and any combination thereof.

Figure 13:
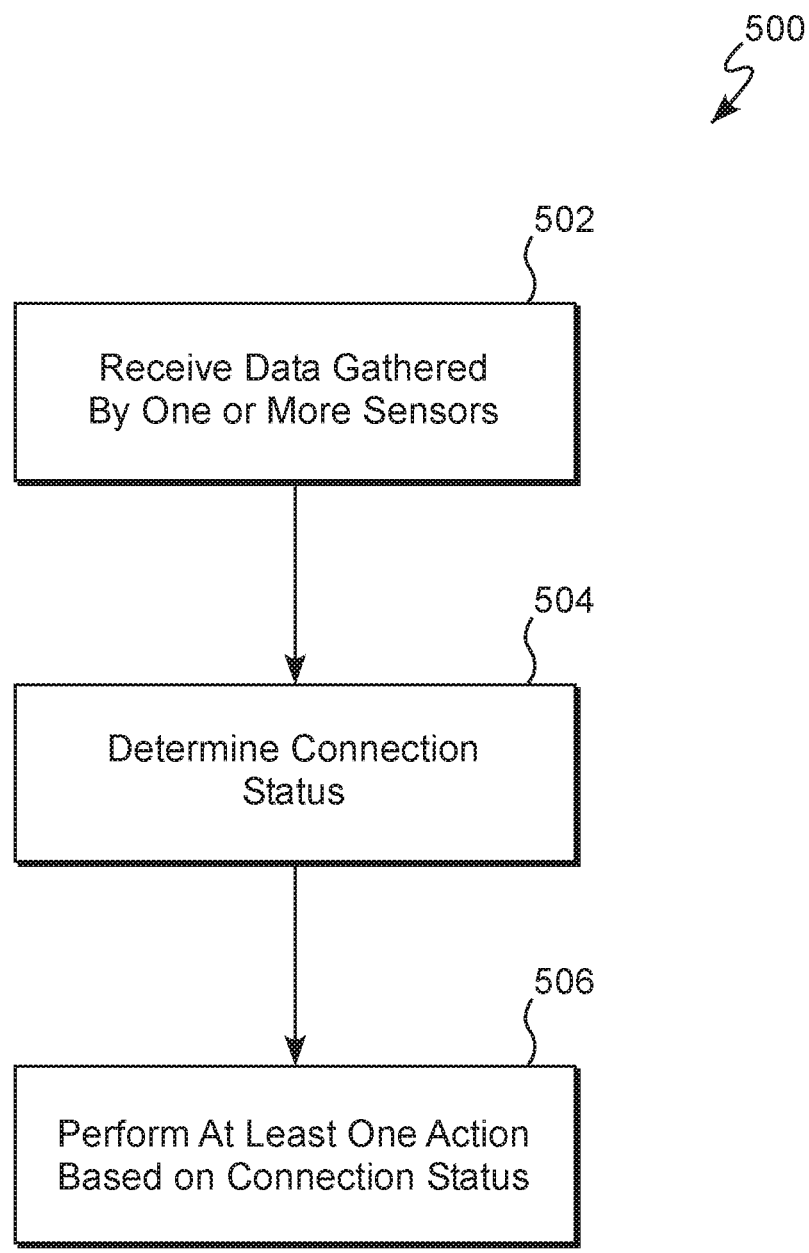
FIG. 13 is a flowchart of a process for detecting connection of a connector of a fall protection compliance system to a connection structure in accordance with some non-limiting embodiments or aspects of the present disclosure.

Referring now to FIG. 13, FIG. 13 is a flowchart of a non-limiting embodiment or aspect of a process 500 for determining a connection status of a connector 200. In some non-limiting embodiments or aspects, one or more of the functions described with respect to process 500 may be performed (e.g., completely, partially, etc.) by the connector 200. In some non-limiting embodiments or aspects, one or more of the steps of process 500 may be performed (e.g., completely, partially, and/or the like) by another device or a group of devices separate from the connector 200, such as the remote device 250.

With continued reference to FIG. 13, at step 502, the process 500 may include receiving, with the control device 216, data gathered by one or more sensors 215. For example, in some non-limiting embodiments or aspects, the process 500 may include receiving connection data gathered by the at least one magnetometer 217. Detecting the presence of the disturbance in the magnetic field may be indicative of a presence of a ferromagnetic material of the connection structure 300 within the connection area 206 of the connector 200. Conversely, detecting the absence of the disturbance in the magnetic field may be indicative of an absence of the ferromagnetic material of the connection structure 300 within the connection area 206 of the connector 200. As described herein, the at least one magnetometer 217 is configured to detect a presence or an absence of a disturbance in a pre-defined magnetic field within the connection area 206 generated by the permanent magnet. The connection data may include, for example, a signal that corresponds to the characteristics of a magnetic field detected by the at least one magnetometer 217.

With continued reference to FIG. 13, at step 502, the process 500 may further include receiving, with the control device 216, communication data gathered by the at least one short-range wireless communication antenna 221. Detecting the presence of the identification element 320 may be indicative of a presence of an approved connection structure 300. Conversely, detecting the absence of the identification element 320 (i.e., not detecting the identification element 320) may be indicative of an absence of the approved connection structure 300. As described herein, the at least one short-range wireless communication antenna 221 is configured to detect a presence or an absence of an identification element 320 that is connected to the connection structure 300. The communication data may include, for example, a signal that is indicative of whether the identification element 320 is within the detection range of the at least one short-range wireless communication antenna 221.

With continued reference to FIG. 13, at step 504, the process 500 may include determining, with the control device 216, a connection status of the connector 200 based on detecting the presence or the absence of the disturbance in the magnetic field via the at least one magnetometer 217. For example, by detecting the presence of the disturbance in the magnetic field via the at least one magnetometer 217, the control device 216 may correlate such disturbance to be indicative of a presence of a ferromagnetic material of the connection structure 300 within the connection area 206 of the connector 200. Conversely, by detecting the absence of the disturbance in the magnetic field via the at least one magnetometer 217, the control device 216 may correlate such absence of the disturbance to an absence of the ferromagnetic material of the connection structure 300 within the connection area 206 of the connector 200.

With continued reference to FIG. 13, at step 504, the process 500 may further include determining, with the control device 216, a connection status of the connector 200 based on detecting the presence or the absence of the identification element 320 on the connection structure 300 via the at least one short-range wireless communication antenna 221. For example, by detecting the presence of the identification element 320 via the at least one short-range wireless communication antenna 221, the control device 216 may correlate such presence to be indicative of a presence of an approved connection structure 300. Conversely, by detecting the absence of the identification element 320 (i.e., not detecting the identification element 320) via the at least one short-range wireless communication antenna 221, the control device 216 may correlate such absence to be indicative of an absence of the approved connection structure 300.

With continued reference to FIG. 13, at step 506, the process 500 may include performing, with the control device 216, at least one action based on the connection status. For example, the control device 216 may provide a first visual, audio, and/or tactile indication that is indicative of a presence of a ferromagnetic material of the connection structure 300 within the connection area 206 and/or a presence of an identification element 320 on the connection structure 300. Conversely, the control device 216 may provide a second visual, audio, and/or tactile indication that is indicative of an absence of the ferromagnetic material of the connection structure 300 within the connection area 206 and/or an absence of an identification element 320 on the connection structure 300. In further examples, the control device 216 may be configured to transmit the connection status to a remote device 250 via the communication network 402.

The language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments of the disclosure is intended to be illustrative, but not limiting, of the scope of the disclosure, which is set forth in the following claims.

Although the disclosure has been described in detail for the purpose of illustration based on what are currently considered to be the most practical and preferred embodiments or aspects, it is to be understood that such detail is solely for that purpose and that the disclosure is not limited to the disclosed embodiments or aspects, but, on the contrary, is intended to cover modifications and equivalent arrangements that are within the spirit and scope of the appended claims. For example, it is to be understood that the present disclosure contemplates that, to the extent possible, one or more features of any embodiment or aspect can be combined with one or more features of any other embodiment or aspect.

What is claimed is:

1. A computer-implemented method for detecting connection of a connector to a connection structure, the connection structure having a connection loop, a connection anchor, and a passive identification element laterally disposed on a crossbar between the connection loop and the connection anchor so as to spatially separate the connection loop from the connection anchor, the connector comprising a frame having an opening and a connection area configured for receiving the connection structure therein and a connection sensor assembly associated with the frame, the connection sensor assembly comprising at least one short-range wireless communication antenna configured for gathering connection data based on detecting a presence or an absence of the passive identification element on the connection structure when the connection structure is received within the connection area of the frame, the method comprising:
   receiving, with a control device comprising at least one processor, the connection data gathered by the connection sensor assembly;
   determining, with the control device, a connection status of the connector based on the connection data; and
   performing, with the control device, at least one action based on the connection status.

2. The method according to claim 1, wherein performing the at least one action includes providing at least one of a visual indication, an audio indication, and a tactile indication based on the connection status.

3. A connector for a fall protection compliance system, the connector comprising:
   a frame having an opening and a connection area configured for receiving a connection structure therein, the connection structure having a connection loop, a connection anchor, and a passive identification element laterally disposed on a crossbar between the connection loop and the connection anchor so as to spatially separate the connection loop from the connection anchor; and
   a connection sensor assembly associated with the frame, the connection sensor assembly comprising:
      at least one short-range wireless communication antenna configured for gathering connection data based on detecting a presence or an absence of the passive identification element on the connection structure when the connection structure is received within the connection area of the frame; and
      a control device comprising at least one processor programmed or configured to:
         receive the connection data from the at least one short-range wireless communication antenna;
         determine a connection status of the connector based on the connection data; and
         perform at least one action based on the connection status.

4. The connector according to claim 3, wherein detecting the presence of the passive identification element is indicative of a presence of an approved connection structure, and wherein detecting the absence of the passive identification element is indicative of an absence of the approved connection structure.

5. The connector according to claim 3, wherein the connection status comprises a connected status indicative of a presence of an approved connection structure, and a disconnected status indicative of an absence of the approved connection structure.

6. The connector according to claim 3, wherein the at least one action includes providing at least one of a visual indication, an audio indication, and a tactile indication based on the connection status.

7. The connector according to claim 3, wherein the connection sensor assembly further comprises a communication interface, and wherein the at least one action includes transmitting the connection status to a remote device using the communication interface.

8. A fall protection compliance system comprising:
- a connection structure having a connection loop, a connection anchor, and an identification element disposed on a deflectable element in the connection loop;
- a frame having an opening and a connection area configured for receiving a connection structure therein; and
- a connection sensor assembly associated with the frame, the connection sensor assembly comprising:
  - at least one short-range wireless communication antenna configured for gathering connection data based on detecting a presence or an absence of the identification element on the connection structure when the connection structure is received within the connection area of the frame; and
  - a control device comprising at least one processor programmed or configured to:
    - receive the connection data from the at least one short-range wireless communication antenna;
    - determine a connection status of the connector based on the connection data; and
    - perform at least one action based on the connection status.

9. The system according to claim 8, wherein detecting the presence of the passive identification element is indicative of a presence of an approved connection structure, and wherein detecting the absence of the passive identification element is indicative of an absence of the approved connection structure.

10. The system according to claim 9, wherein the at least one action includes providing at least one of a visual indication, an audio indication, and a tactile indication based on the connection status.

11. The system according to claim 8, wherein the connection status comprises a connected status indicative of a presence of an approved connection structure, and a disconnected status indicative of an absence of the approved connection structure.

12. The system according to claim 8, wherein the deflectable element is paddle-shaped.

13. The system according to claim 8, wherein the deflectable element is configured to pivot around an axis between an undeflected, or closed position and a deflected, or open position.

14. The system according to claim 13, wherein the deflectable element is biased into the closed position by a biasing mechanism.

15. The system according to claim 8, wherein the deflectable element is configured to interact with a switch which is used to determine whether the connection structure is connected to the frame.

* * * * *